United States Patent
Carr et al.

(10) Patent No.: US 9,727,987 B2
(45) Date of Patent: Aug. 8, 2017

(54) BLENDING TECHNIQUES FOR CURVE FITTING

(71) Applicant: Adobe Systems Incorporated, San Jose, CA (US)

(72) Inventors: Nathan A. Carr, San Jose, CA (US); Gregg D. Wilensky, Pacific Palisades, CA (US); Stephen N. Schiller, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/289,408

(22) Filed: May 28, 2014

(65) Prior Publication Data
US 2015/0325016 A1  Nov. 12, 2015

Related U.S. Application Data

(60) Provisional application No. 61/992,083, filed on May 12, 2014.

(51) Int. Cl.
 *G06T 11/20* (2006.01)
(52) U.S. Cl.
 CPC ............ *G06T 11/20* (2013.01); *G06T 11/203* (2013.01)
(58) Field of Classification Search
 None
 See application file for complete search history.

(56) References Cited

U.S. PATENT DOCUMENTS

| | | | |
|---|---|---|---|
| 5,940,083 A * | 8/1999 | Broekhuijsen | G06T 11/203 345/442 |
| 6,067,094 A * | 5/2000 | Schuster | G06T 11/001 345/441 |
| 6,268,871 B1 | 7/2001 | Rice et al. | |
| 6,614,456 B1 | 9/2003 | Rzepkowski et al. | |
| 6,641,456 B2 | 11/2003 | Wang | |
| 6,829,380 B1 * | 12/2004 | Choo | G03F 7/70441 250/492.22 |
| 7,868,887 B1 * | 1/2011 | Yhann | G06T 11/203 345/442 |
| 9,501,848 B2 | 11/2016 | Wilensky et al. | |
| 2003/0065476 A1 | 4/2003 | Schmidt et al. | |

(Continued)

FOREIGN PATENT DOCUMENTS

| | | |
|---|---|---|
| CN | 102147600 | 8/2011 |
| EP | 1562138 | 8/2005 |
| GB | 2520120 | 5/2015 |

OTHER PUBLICATIONS

Baran et al., "Sketching clothoid splines using shortest paths." Computer Graphics Forum. vol. 29. No. 2. Blackwell Publishing Ltd, 2010.*

(Continued)

*Primary Examiner* — Xiao Wu
*Assistant Examiner* — Steven Elbinger
(74) *Attorney, Agent, or Firm* — Wolfe-SBMC

(57) ABSTRACT

Blending techniques for curve fitting are described. In one or more implementations, an indication is received of three or more data points. A blending factor is computed based on a spatial relationship of the three or more data points to each other. A curve is fit to the three or more data points by blending a plurality or curve fitting techniques using the computed blending factor.

19 Claims, 14 Drawing Sheets

(56) References Cited

U.S. PATENT DOCUMENTS

| | | | | |
|---|---|---|---|---|
| 2004/0109479 | A1* | 6/2004 | Heinrich | H01S 5/141 372/20 |
| 2009/0141038 | A1 | 6/2009 | Newaskar et al. | |
| 2010/0060642 | A1* | 3/2010 | Chhaparwal | G06T 11/206 345/440 |
| 2010/0289802 | A1 | 11/2010 | Falchetto | |
| 2011/0210943 | A1* | 9/2011 | Zaliva | G06F 3/0414 345/174 |
| 2011/0301915 | A1* | 12/2011 | Lobato | G01B 21/04 702/167 |
| 2011/0305379 | A1* | 12/2011 | Mahfouz | A61F 2/3094 382/131 |
| 2014/0240322 | A1* | 8/2014 | Brumer | G06T 11/203 345/442 |
| 2015/0062129 | A1 | 3/2015 | Wilensky | |
| 2015/0289149 | A1* | 10/2015 | Ouyang | H04W 24/02 370/252 |
| 2017/0039740 | A1 | 2/2017 | Wilensky et al. | |

OTHER PUBLICATIONS

"Combined Search and Examination Report", GB Application No. 1415391.0, Mar. 2, 2015, 7 pages.

Baran, et al.,' "Sketching Clothoid Splines Using Shortest Paths", Eurographics '0x, vol. 0 (1981), No. 0, 2009, 15 pages.

Bertails-Descoubes, "Super-Clothoids", Eurographics 2012, vol. 31, No. 2, 2012, 10 pages.

Deddi, et al.,' "Interpolation with Curvature Constraints", Curve & Surface Fitting, Vanderbilt University Press, Dec. 15, 2009, 13 pages.

Grimm, et al.,' "Just Draw It! A 3D Sketching System", Eurographics Symposium on Sketch-Based Interfaces and Modeling, 2012, 15 pages.

Habib, et al.,' "Fairing Arc Spline and Designing by Using Cubic Bezier Spiral Segments", Mathematical Modelling and Analysis, vol. 17, No. 2, pp. 141-160, Apr. 2012, 21 pages.

Havemann, et al.,' "Curvature-Controlled Curve Editing Using Piecewise Clothoid Curves", Computers & Graphics 37 (2013)., retrieved from <http://www.sciencedirect.com/science/article/pii/S0097849313000915> on Aug. 12, 2013,2013, pp. 764-773.

Hoffmann, et al.,' "On Interpolation by Spline Curves with Shape Parameters", Proceedings of the 5th International Conference on Advances in Geometric Modeling and Processing, Springer-Verlag, Berlin, Heidelberg, GMP '08, pp. 205-214, 2008, 10 pages.

Kilgard, et al.,' "GPU-Accelerated Path Rendering", Computer Graphics Proceedings, Annual Conference Series, SIGGRAPH Asia 2012, 2012, 10 pages.

Kochanek, "Interpolating Splines with Local Tension, Continuity, and Bias Control", Computer Graphics, vol. 18, No. 3, Jul. 1984, pp. 33-41.

Levien, "From Spiral to Spline: Optimal Techniques in Interactive Curve Design", PhD Thesis, EECS Department, University of California, Berkeley, 2009, 253 pages.

McCrae, et al.,' "Sketching Piecewise Clothoid Curves", Computers & Graphics 33, 2009, pp. 452-461.

Peigl, "On NURBS: A Survey", IEEE Computer Graphics & Applications, Jan. 1991, pp. 55-71.

Sarfraz, et al.,' "Shape-Preserving Curve Interpolation", International Journal of Computer Mathematics, vol. 89, No. 1, Jan. 2012, pp. 35-53.

Thiel, et al.,' "Elasticurves: Exploiting Stroke Dynamics and Inertia for the Real-time Neatening of Sketched 2D Curves", UIST '11, Oct. 16-19, 2011, Santa Barbara, CA, USA, Oct. 16, 2011, pp. 383-392.

Thoo, "Some Derivatives of Newton's Method", PRIMUS XII, 2, Jan. 29, 2001, 17 pages.

Yoshida, et al.,' "Log-Aesthetic Space Curve Segments", 2009 SIAM/ACM Joint Conference on Geometric and Physical Modeling, ACM, New York, NY, USA, SPM '09, 2009, 12 pages.

Yuksel, et al.,' "Parameterization and Applications of Catmull-Rom Curves", Computer-Aided Design, vol. 43, No. 7, Aug. 23, 2010, 24 pages.

Zayer, "A Nonlinear Static Approach for Curve Editing", Computers & Graphics 36, 2012, pp. 514-520.

"Pre-Interview Communication", U.S. Appl. No. 14/016,987, Jul. 17, 2015, 3 pages.

Salomon,"Curves and Surfaces for Computer Graphics", Springer Science + Business Media, Inc., Sep. 8, 2005, 8 pages.

Wang,"Selecting Optimal Parameter Value of Single Parameter Line Simplification Algorithm Based on Maximum Curvature", International Conference on Web Information Systems and Mining, IEEE Computer Society, Oct. 23, 2010, 4 pages.

"Non-Final Office Action", U.S. Appl. No. 14/016,987, Mar. 11, 2016, 26 pages.

"Combined Search and Examination Report", GB Application No. 150778.1, Nov. 6, 2015, 8 pages.

"Final Office Action", U.S. Appl. No. 14/016,987, Nov. 18, 2015, 23 pages.

"Foreign Office Action", GB Application No. 1415391.0, Sep. 3, 2015, 7 pages.

"Notice of Allowance", U.S. Appl. No. 14/016,987, Jul. 13, 2016, 5 pages.

* cited by examiner

800

Algorithm 1 Quadratic κCurve Algorithm

```
for i = 1 .. N − 1 do                    ▷ estimate initial positions r_i
    r_i = (r_{c_{i−1}} + r_{c_i})/2
end for
while not converged do
    for i = 0 .. N − 1 do                ▷ update max curvature times
        t_{c_i} = computeMaxCurvatureTime(r_i, r_{c_i}, r_{i+1})
    end for
    Solve matrix system Ax = b           ▷ update positions
end while
for i = 1 .. N − 1 do                    ▷ compute Bézier end points
    r_i = (r_{m_{i−1}} + r_{m_i})/2
end for
```

1300

1302
Choose which of a plurality of curve fitting techniques to apply based on a spatial relationship of a plurality of data points to which a curve is to be fit

1304
Fit the curve to the plurality of data points using the chosen ones of the plurality of curve fitting techniques

BLENDING TECHNIQUES FOR CURVE FITTING

RELATED APPLICATION

This application claims priority as a non-provisional of U.S. Provisional Patent Application No. 61/992,083, filed May 12, 2014 and titled "Blending Techniques for Curve Fitting," the entire disclosure of which is hereby incorporated by reference.

BACKGROUND

Curve fitting refers to the fitting of a curve (e.g., path) between data points. This may be utilized for a variety of different purposes, such as to indicate correspondence of the data points, one to another, for spreadsheets, to draw animation paths, plotting temperatures, and so on.

However, conventional techniques that were utilized to perform curve fitting could depart from the expectations of users that avail themselves of the functionality. For example, unexpected peaks, loops and so on may be observed in a curve fit using conventional techniques between the data points that do not "follow the flow" exhibited by the data points as expected by a user. Consequently, users of conventional techniques were often forced to manually correct the curve, which could be frustrating and inefficient.

SUMMARY

Blending techniques for curve fitting are described. In one or more implementations, an indication is received of three or more data points. A blending factor is computed based on a spatial relationship of the three or more data points to each other. A curve is fit to the three or more data points by blending a plurality or curve fitting techniques using the computed blending factor.

In one or more implementations, a system includes one or more modules implemented at least partially in hardware. The one or more modules are configured to perform operations that include receiving an indication to fit a curve to a plurality of data points, determining a spatial relationship of the plurality of data points to each other and blending a plurality of curve fitting techniques to perform the fitting of the curve, the blending using at least one heuristic that is based on the determined spatial relationship.

In one or more implementations, one or more computer readable storage media comprise instructions stored thereon that, responsive to execution by a computing device, causes the computing device to perform operations including choosing which of a plurality of curve fitting techniques to apply based on a spatial relationship of a plurality of data points to which a curve is to be fit and fitting the curve to the plurality of data points using the chosen ones of the plurality of curve fitting techniques.

In one or more implementations, a system includes one or more modules implemented at least partially in hardware, the one or more modules configured to perform operations comprising configuring a user interface to support direct editing of complex curves by configuring points of contact disposed directly on the complex curve to support movement specified by a user and automatically and without user intervention adjusting a respective said curve of the complex curve such that the respective said curve maintains slope and curvature continuity in relation to the complex curve.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional techniques that are utilized to fit curves to data points may lack sufficient intuitive interaction and ease of use. Further, these conventional techniques could also result in a curve that departed from a user's expectations, such as due to inclusion of peaks, loops, and so on that do not appear to follow the rest of the data points and thus depart from a user's expectations in the fitting of the curve.

Blending techniques for curve fitting are described. In one or more implementations, blending techniques are employed to blend different curve fitting techniques to fit a curve to a plurality of data points, such as for spreadsheets, to draw animation paths, plotting temperatures, and so on. For example, a computing device may receive an indication of successive data points, through which, a curve is to be fit as a path between the points. Heuristics are used to compute a blending factor based on a spatial relationship of the data points to each other, such as based on symmetry, flatness, Sign of curvature, and so on.

This blending factor may then be used to choose which of a plurality of curve fitting techniques are to be used to fit the curve as well as how to blend two or more of the techniques together. For instance, the computing device may make an estimate using a quadratic Bézier curve fitting technique, e.g., to estimate a tangent direction and radius of curvature for the curve for the data points. These estimates may then serve as a basis to determine how to blend other curve fitting techniques together, such as for a cubic Bézier curve fitting technique with a circle curve estimate technique. In this way, blending may be used to fit a curve in an intuitive manner, further discussion of which may be found in relation to the following sections.

In the following discussion, an example environment is first described that may employ the blending techniques described herein. Example procedures are then described which may be performed in the example environment as well as other environments. Consequently, performance of the example procedures is not limited to the example environment and the example environment is not limited to performance of the example procedures.

Example Environment

Figure 1:
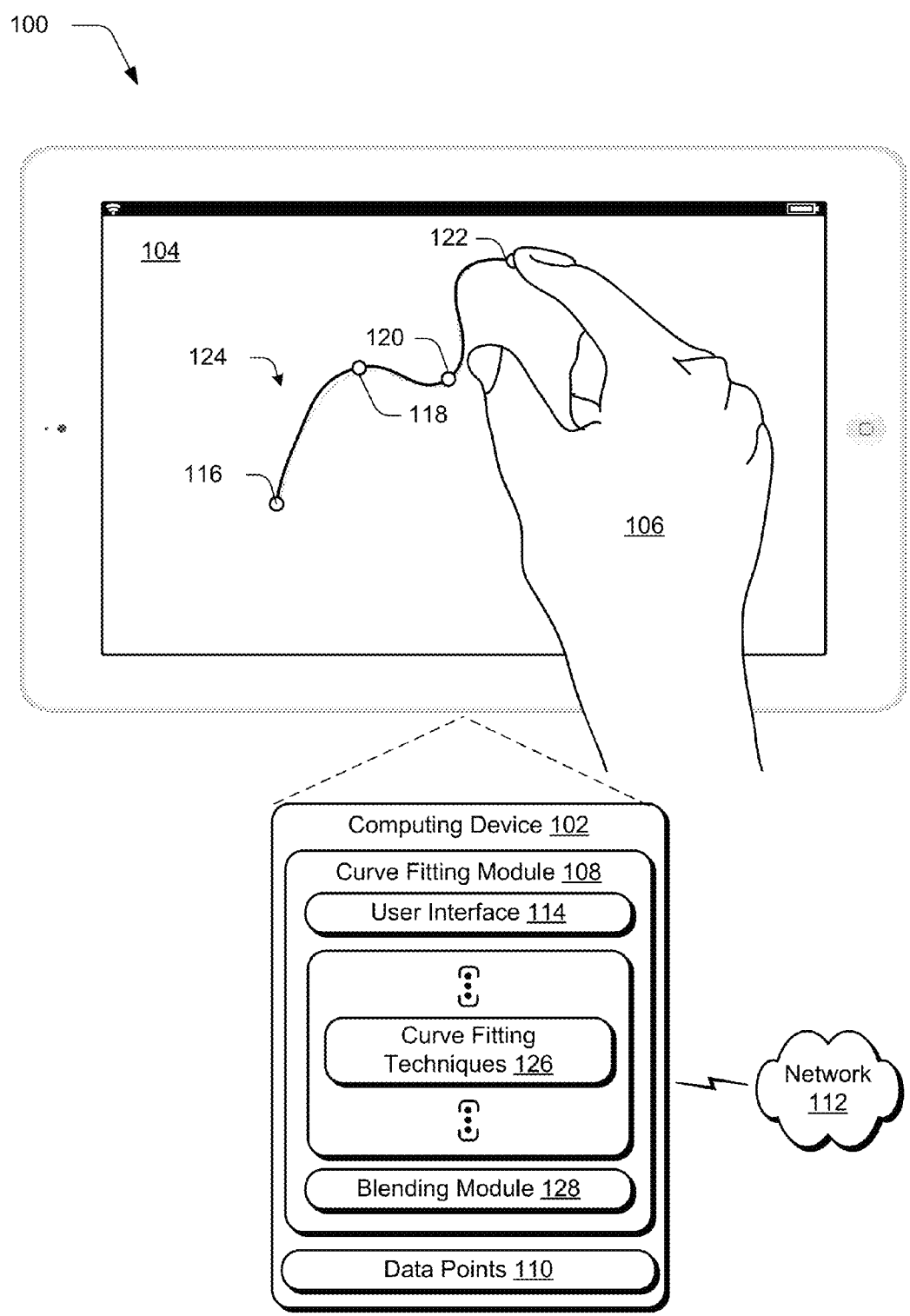
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. For example, as illustrated the computing device 102 is configured in a mobile configuration as a tablet that includes a display device 104 having touchscreen functionality that is configured to recognize touch inputs, such as those from a user's hand 106. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 14.

The computing device 102 is illustrated as including a curve fitting module 108. The curve fitting module 108 is representative of functionality relating to the fitting of a curve to a plurality of data points 110 as well as functionality relating to interaction (e.g., modifying) the curve. Although illustrated as implemented on the computing device 102, the curve fitting module 108 may be implemented in a variety of ways, such as remotely via a web service of a service provider that is accessible "on the cloud" via the network 112, distributed between the service provider and the computing device 102, and so on.

In the illustrated example, a user interface 114 is illustrated as displaying a plurality of data points 116, 118, 120, 122 as being input via a gesture that is detected via touchscreen functionality of the display device 104, such as through use of one or more capacitive sensors. This may be performed as part of a variety of different functionality, such as to specify a path via which an object is to be animated, used to specify a seam for image processing, and so on. Other examples are also contemplated, such as data points 110 received from a spreadsheet, sensor readings, presentation software, and so on.

The curve fitting module 108, upon receipt of the data points 116-122, may then fit a curve 124 automatically and without user intervention based on the data points 116-122. For example, the curve fitting module 108 may be configured to employ a plurality of different curve fitting techniques 126, such as quadratic Bézier curve techniques, cubic Bézier curve techniques, and circle curve estimate techniques. Each of these curve fitting techniques 126 may have strengths and weaknesses when confronted with different spatial relationships of data points 110. Accordingly, the curve fitting module 108 may employ a blending module 128 that is representative of functionality to choose which of the curve fitting techniques 126 to use for a particular set of data points 110 as well as how to blend the plurality of curve fitting techniques 126 together to achieve a final result of a curve 124 that is fit to the points. In this way, the curve fitting module 108 may be configured to fit a curve 124 that is both visually pleasing and "expected" by a user of the curve fitting module 108, further discussion of which follows and is shown in a corresponding figure.

Figure 2:
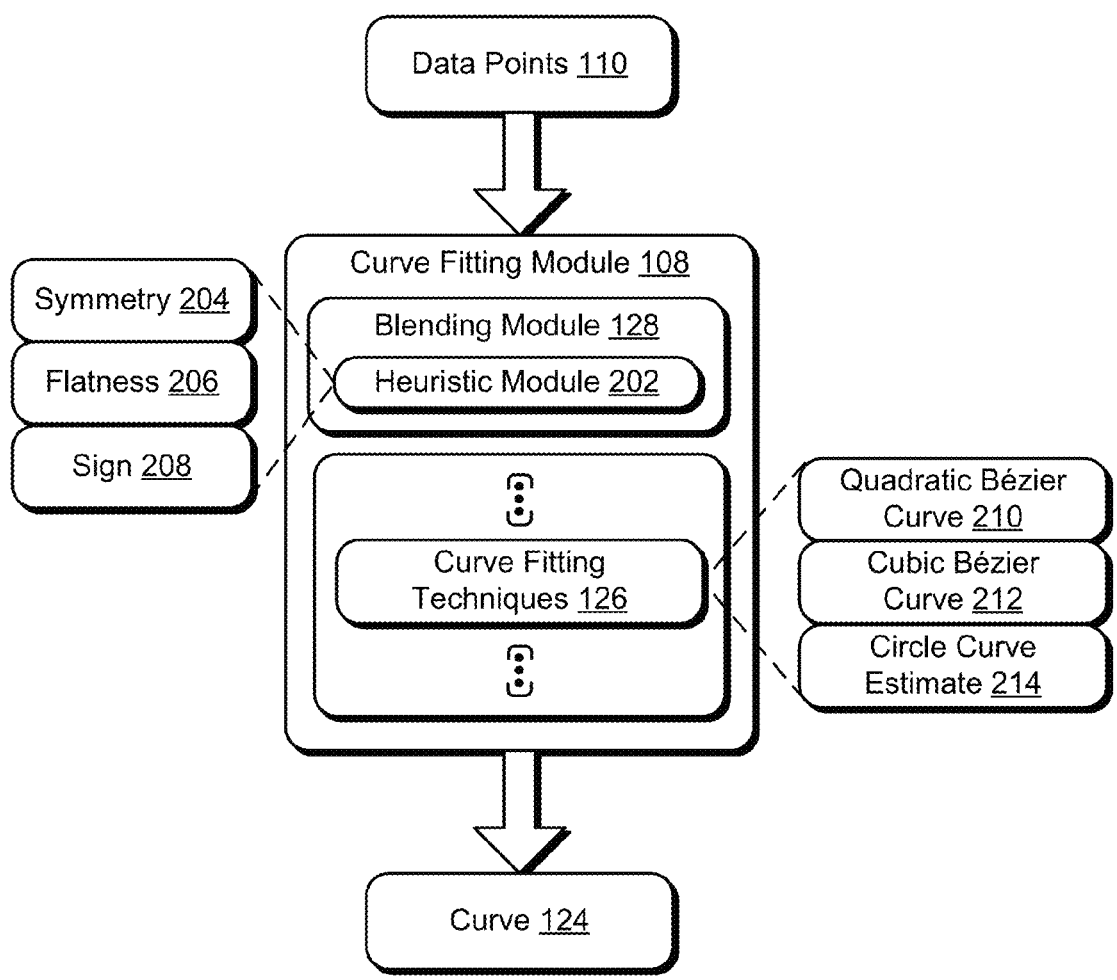
FIG. 2 depicts a system in an example implementation showing a blending module of FIG. 1 in greater detail along with examples of curve fitting techniques that may be employed by a curve fitting module.

FIG. 2 depicts a system 200 in an example implementation showing the blending module 128 of FIG. 1 in greater detail along with examples of curve fitting techniques 126 that may be employed by the curve fitting module 108. The curve fitting module 108 is illustrated as receiving inputs specifying data points 110 and outputting a curve 124 that is fit to those data points. The perform this fitting, the curve fitting module 108 may employing a blending module 128 that is representative of functionality to choose which (and even "how much") of the curve fitting techniques 126 are to be applied to fit the curve 124.

To aid in this choice, the blending module 128 may employ a heuristic module 202 that is representative of functionality to employ one or more heuristics to guide in the fitting of the curve. The heuristics, for instance, may be based on a spatial relationship of the data points 110 to each other in order to fit the curve, such as based on a specified order of the data points 110 and the relationship of each of those data points to previous and/or subsequent ranges of data points. Examples of such heuristics include symmetry 204, flatness 206, and sign 208, use of which is further described in the following figures.

These heuristics as calculated by the heuristic module 202 may then be used to generate a blending factor that may specify which of the curve fitting techniques 126 are to be employed in the fitting of the curve, may specify a weight to be given to each of the curve fitting techniques 126, and so forth. Examples of such curve fitting techniques 126 include a quadratic Bézier curve 210, a cubic Bézier curve 212, a circle curve estimate 214, and so on, further discussion of which may also be found in the following examples.

Figure 3:
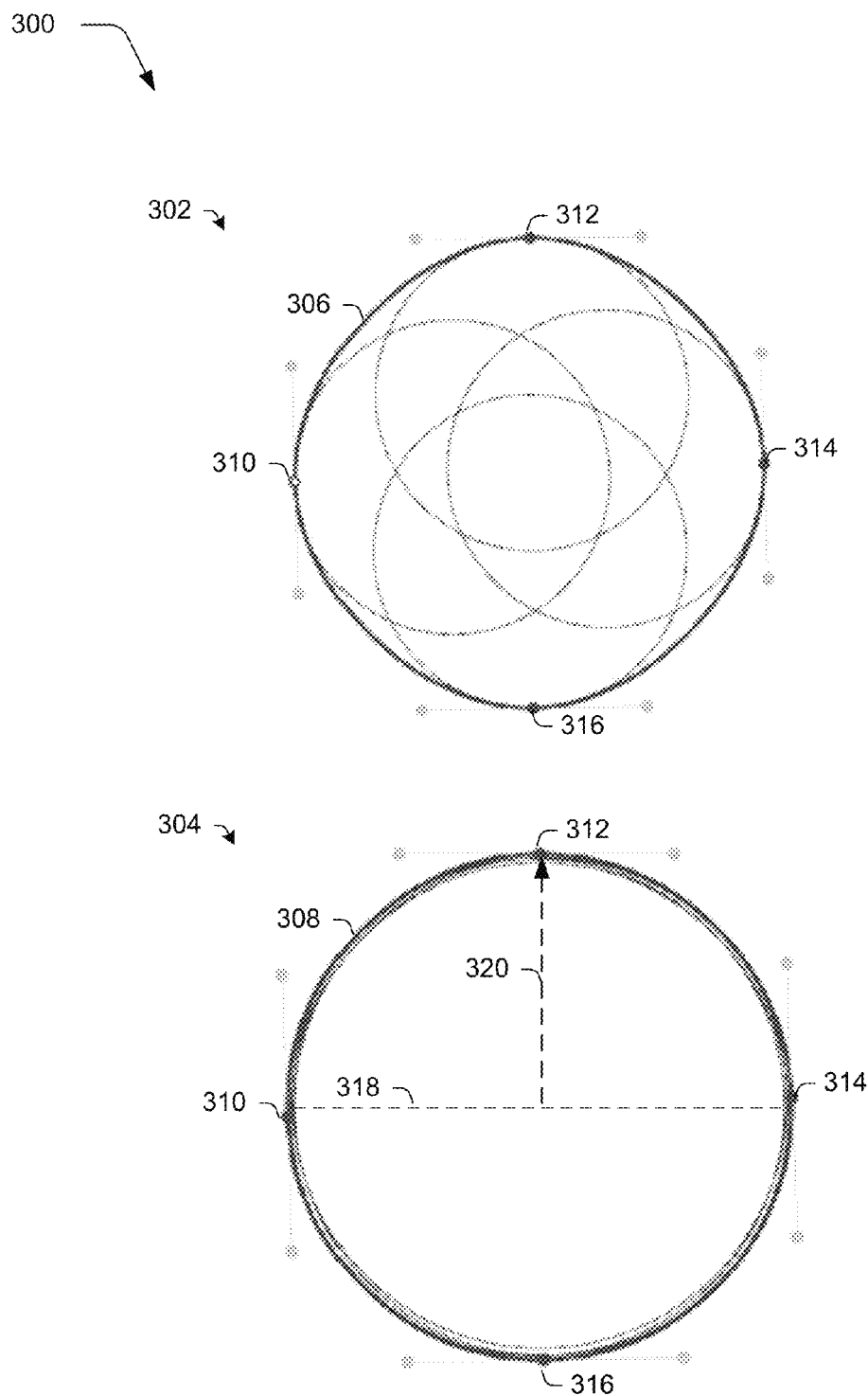
FIG. 3 depicts an example of use of a symmetry heuristic to generate a blending factor by the blending module that specifies usage of different ones of the curve fitting techniques.

FIG. 3 depicts an example 300 of use of a symmetry 204 heuristic to generate a blending factor by the blending module 128 that specifies usage of different ones of the curve fitting techniques 126. First and second examples 302, 304 of curves 306, 308 fit to data points 310, 312, 314, 316 are shown. In the first example 302, a curve 306 is fit to the data points 310, 312, 314, 316 using a quadratic Bézier curve 210 of FIG. 2. Tangents having controls are illustrated at respective data points 310-316 are illustrated that specify scaling factors for curvature agreement between adjacent curves.

Circles draw within an interior of the curve 306 illustrate a radius of curvature at respective data points 310-316. Thus, as indicated by the circles, the curves drawn between the data points 310-316 in the first example 302 have curvatures that vary, e.g., that lessen toward a midpoint and then increase back as approaching another data point. Therefore, this curve 306 may vary from a user's expectation of a circle.

In the second example 304, however, a curve 308 is also fit between the data points 310-316, but in this case leverages a circle curve estimate 214 technique. The circle curve estimate technique 214 estimates a circle for each collection of three successive data points. Thus, as illustrated the radius of curvature at respective data points 310-316 (e.g., the inner circles) also follows a circle defined by the curve 308, which may be used to achieve a desired result of a user, e.g., a likelihood of drawing a circle in this example.

The heuristic module 202 of the blending module 128 of FIG. 2 may employ a variety of different heuristics to arrive at a blending factor that may describe which of the curve fitting techniques 126 to use and even a weight to be assigned to the different factors. As shown in the second example 304, for instance, three data points 310, 312, 314 may be defined in succession. A baseline 318 may be defined between the first and third data points 310, 314 and a relationship 320 of the second data point 312 (i.e., the data point defined in succession between the other two data points 310, 314) to the baseline 318 used to define the blending factor. For example, the relationship 320 may be defined based on a point that is approximately perpendicular from the baseline 318 to the second data point 312. This may be used to determine if the second data point 312 falls between the first and third data points 310, 314 along the baseline 318, and if so, the circle curve estimate 214 curve fitting technique 126 is given preference, e.g., a higher weighting, than the quadratic Bézier curve 210 technique.

For example, weightings may be applied based on nearness of the relationship 320 to a midpoint of the baseline 318, e.g., to give greater weighting to the circle curve estimate 214 technique the closer to the midpoint. Once "outside" of this baseline 318 between the first and third data points 310, 314 greater weighting may be given to a different curve fitting technique 126, such as to the quadratic Bézier curve 210 technique. An example of this is described as follows and shown in a corresponding figure.

Figure 4:
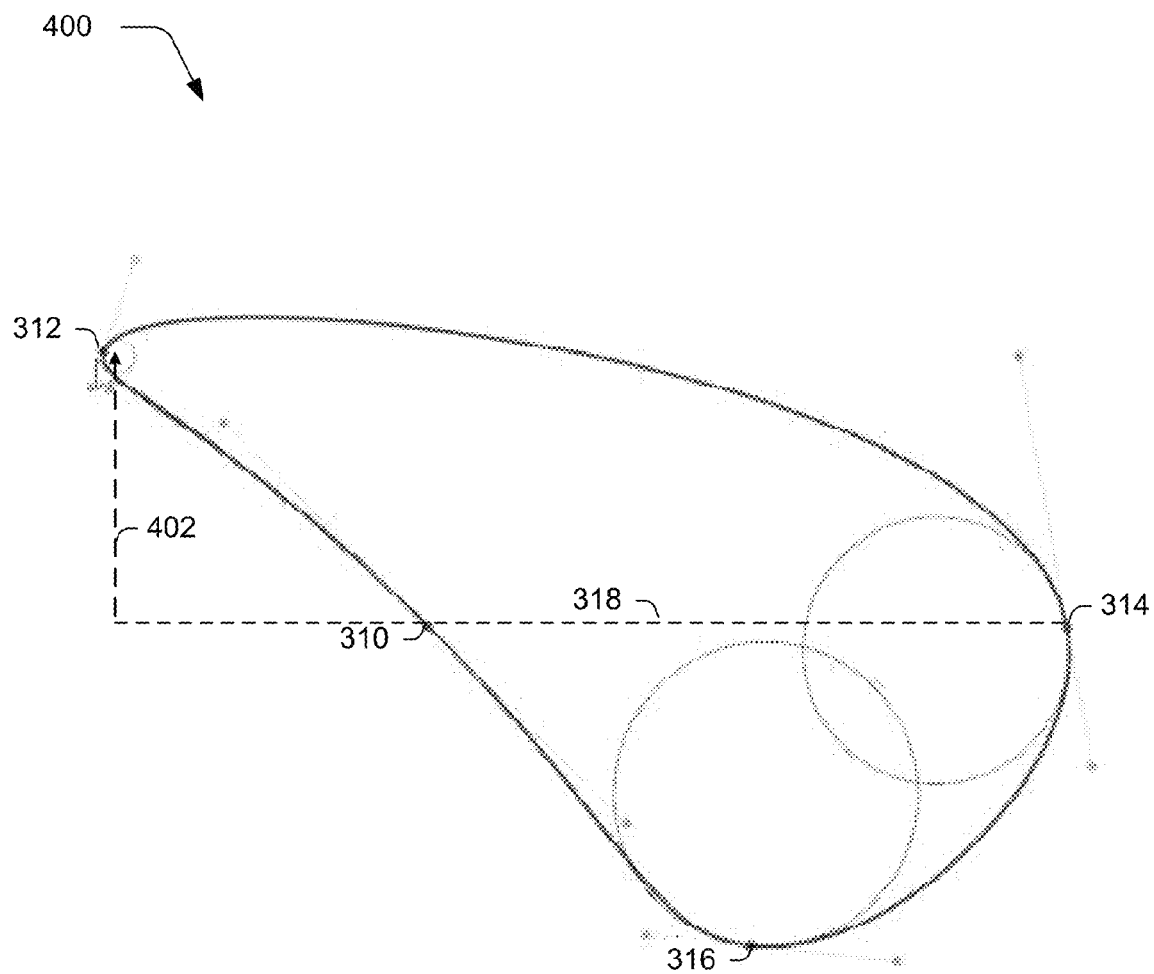
FIG. 4 depicts an example of rearrangement of a spatial relationship of one of the data points of FIG. 3 and a resulting change in a blending factor used to fit a curve to the data points.

FIG. 4 depicts an example 400 of rearrangement of a spatial relationship of one of the data points 312 of FIG. 3 and a resulting change in a blending factor used to fit a curve to the data points 310-316. As illustrated, a cursor control device (e.g., a mouse) in this example moves the data point 310 from an original location as shown in FIG. 3 to a new location as illustrated by the phantom arrow.

This results in a new symmetrical relationship between data points 310, 312, 314 in that the relationship 402 of the second data point 312 to the baseline 318 formed between the first and third data points 310, 314 lies "outside" the points, i.e., is not disposed between these data points 310, 314 along the baseline 318. Therefore, the blending module 128 may arrive at a blending factor that gives greater weight to the quadratic Bézier curve 210 technique than the circle curve estimate 214 technique in this example to fit a curve corresponding to a likely intuition of a user. Thus, a blending may be performed based on how well the data points 310-316 approximate a circle by weighting the different curve fitting techniques.

Figure 5:
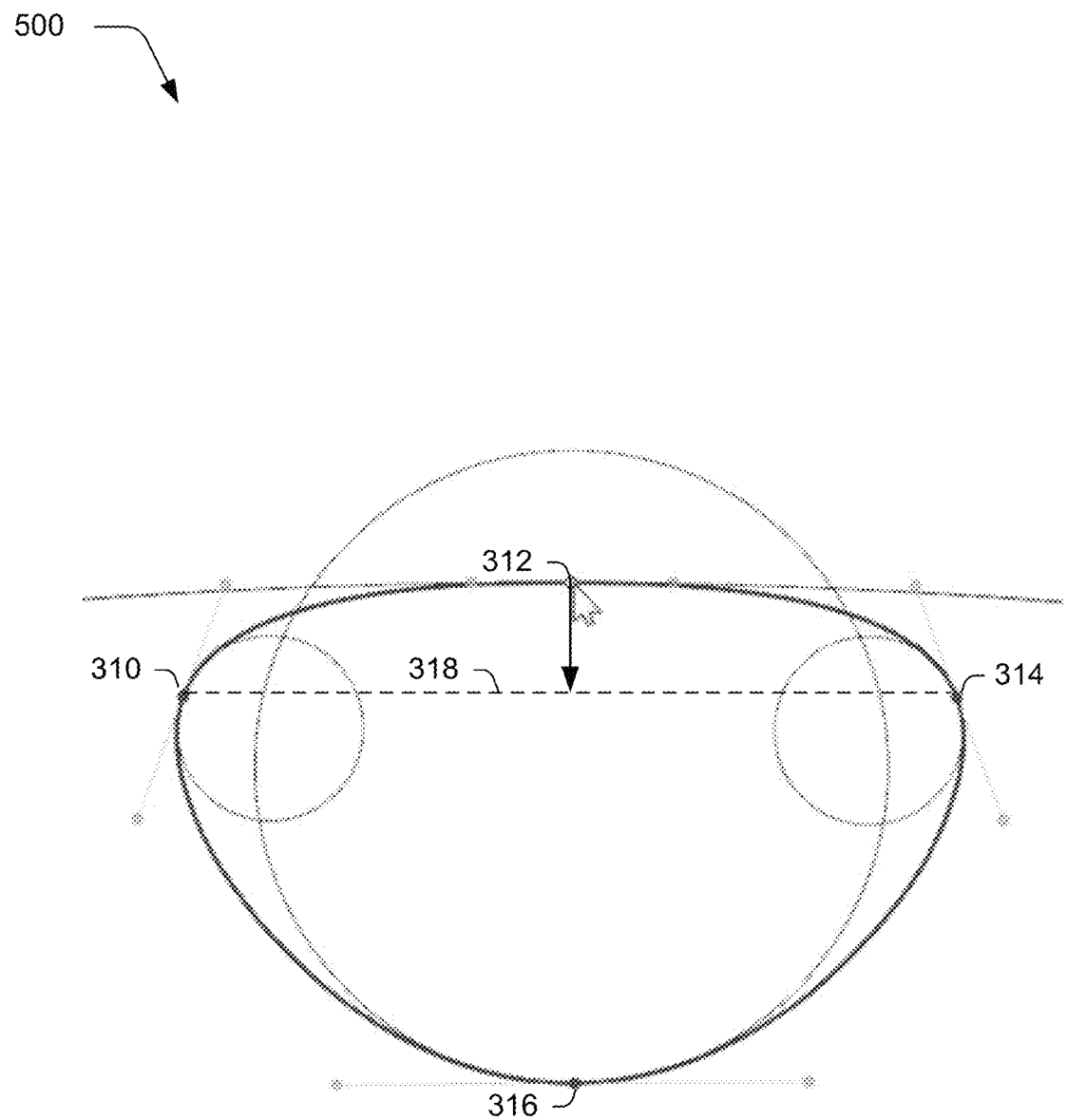
FIG. 5 depicts an example of use of a flatness heuristic to generate a blending factor by the blending module that specifies usage of different ones of the curve fitting techniques.

FIG. 5 depicts an example 500 of use of a flatness 206 heuristic to generate a blending factor by the blending module 128 that specifies usage of different ones of the curve fitting techniques 126. In this example, the second data point 312 is moved toward the baseline 318 defined by the first and third data points 310, 314. This causes the curvature to "flatten out" for the curve segments defined by the first, second, and third data points 310-312 and 312-314. To do this, the blending module 128 may give greater weight to the quadratic Bézier curve 210 the closer the second data point 312 gets to the baseline 318 than the circle curve estimate 214 technique, e.g., once past a predefined threshold. Thus, as is readily apparent from the discussion of FIGS. 3-5 a plurality of heuristics may be used concurrently to calculate a blending factor for a plurality of curve fitting techniques 126.

Figure 6:
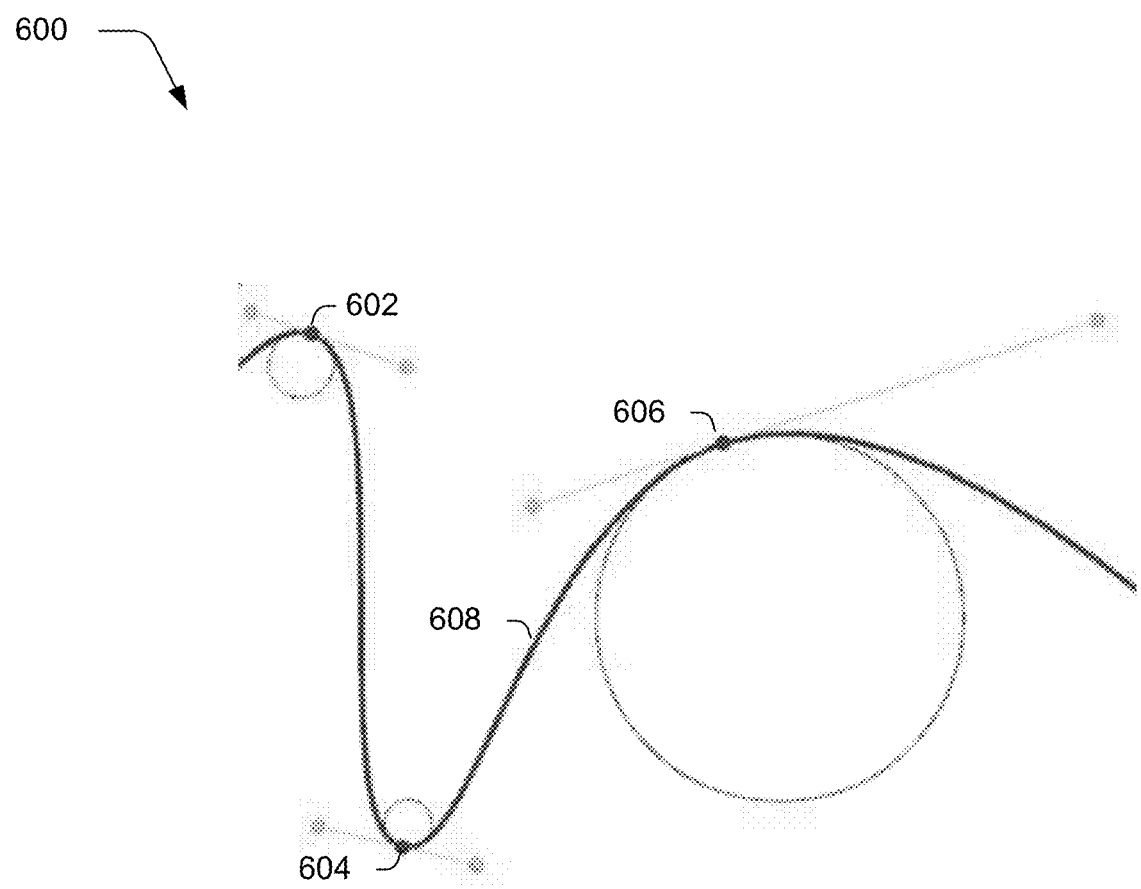
FIG. 6 depicts an example of use of a sign heuristic to generate a blending factor by the blending module that specifies usage of different ones of the curve fitting techniques.

FIG. 6 depicts an example 600 of use of a sign 208 heuristic to generate a blending factor by the blending module 128 that specifies usage of different ones of the curve fitting techniques 126. The illustrated example 600 includes first, second, and third data points 602, 604, 606, to which, a curve 608 is fit. In this example, the blending module 128 examines a sign of curvature at adjacent data points to help in a calculation of a blending factor.

As illustrated for the first and second data points 602, 604, for instance, a sign of curvature 602 for the first data point 602 is different than a sign of curvature for the second data point 602. In other words, the curves bend in opposite directions. The blending module 128 in this instance, may therefore generate a blending factor in which the circle curve estimate 214 technique is not used, thereby choosing another technique such as the quadratic Bézier curve 210 technique. In this way, extraneous curvatures that may be caused using the circle curve estimate 214 technique may be avoided that may cause the curve 604 to "swoop away" from the data points 602-606 in this example. Other examples of curve fitting techniques may be found in the following discussion.

In the following discussion, examples of heuristics and curve fitting techniques are described in greater detail.

Quadratic Bézier κCurves

Consider a quadratic Bézier curve of the form $$r(t)=(1-t)^2 r_0 + 2t(1-t)r_m + t^2 r_1. \quad (1)$$

The function r(t) specifies the coordinate trajectory of the curve as parameterized by the time parameter, t, which varies in value between 0 and 1. Note that at t=0 the curve passes exactly through control point $r_0$, and at t=1 the curve passes through control point $r_1$. However, the curve does not in general pass through the middle control point $r_m$.

Quadratic Interpolating Bézier Curves

A three point quadratic Bézier interpolating scheme may be constructed in which the location of point $r_c$ is controlled to lie on the curve at a position of maximum curvature. For example, for a set of data points $r_0$, $r_c$, $r_1$, the curve starts at $r_0$, passes through $r_c$ and ends at $r_1$. Any time value $t_c \in (0, 1)$ may be selected and solve for the middle Bézier control point $r_m$. Here, and throughout the remainder of the discussion the notation (0, 1) is used to represent the open interval from 0 to 1, i.e. the interval not including the end points.

From equation (1), therefore, the following expression may be written:

$$r_c = (1-t_c)^2 r_0 + 2t_c(1-t_c) r_m + t_c^2 r_1. \quad (2)$$

A simple rearrangement of terms from equation 2 yields:

$$r_c = \frac{r_c - (1-t_c)^2 r_0 - t_c^2 r_1}{2t_c(1-t_c)}. \quad (3)$$

From equation (3), it is shown that a solution always exists for values for $t_c \in (0, 1)$. The degenerate cases of $t_c$ equal to 0 or 1 are straight line segments.

Arc Length

The arc length, s(t), of a curve is given by integrating the speed of the curve over time as follows:

$$s(t) = \int_0^t |r'(u)| du. \quad (4)$$

Note that the primed notation indicates derivatives with respect to the time parameter.

Maximum Curvature

The curvature, $\kappa(t)$, of a continuous space curve is defined to be the rate of change per unit arc length of the unit tangent vector along the curve. The unit tangent vector is given by:

$$T(t) = r'(t)/|r'(t)|. \quad (5)$$

By definition, the following may be expressed:

$$\kappa(t) = \left| \frac{dT(t)}{ds} \right| = \left| \frac{dT(t)/dt}{ds/dt} \right| = \frac{|dT(t)/dt|}{|r'(t)|}. \quad (6)$$

For 2D curves, the equation (6) may be reformulated into the simpler expression as follows:

$$\kappa(t) = \frac{|r'(t) \times r''(t)|}{|r'(t)|^3}. \quad (7)$$

Where the operator denotes the cross product operator (i.e., given two vectors $p=[p_x, p_y]$ and $q=[q_x, q_y]$, $p \times q = p_x q_y - p_y q_x$). The quadratic Bézier given by equation (1) may then be differentiated to yield $$r'(t) = v(t) = (2t-2) r_0 + 2(1-2t) r_m + (2t) r_1 \quad (8)$$

$$r''(t) = a(t) = 2r_0 - 4r_m + 2r_1. \quad (9)$$

Here the variables v(t) and a(t) are used to denote the velocity and acceleration of the curve, respectively. The denominator gives the "speed" of the curve at time t. Note that for a quadratic Bézier the acceleration term is constant. At time t=0 and t=1 the velocities of the curve are then given by:

$$v_0 = 2(r_m - r_0) \quad (10)$$

$$v_1 = 2(r_1 - r_m). \quad (11)$$

For a quadratic Bézier curve the velocity varies linearly in t as follows:

$$v(t) = v_0 + t a_0 \quad (12)$$

These values may therefore be included in the expression for the curvature (7) to find:

$$\kappa(t) = \frac{|(v_0 + t a_0) \times (a_0)|}{|v(t)|^3} = \frac{|v_0 \times a_0|}{|v(t)|^3}. \quad (13)$$

Note that the numerator of expression (13) is constant. As previously described, however, it may be desirable is to place a control point at an approximate location at which the curvature reaches its maximum value. This entails a determination of the time parameter for which this maximum curvature value is reached. Since the numerator in expression (13) is constant, a maximum of the function may be found by minimizing the denominator. Equivalently, the square of the speed may be minimized by differentiating it and setting it to zero:

$$0 = \frac{d}{dt}(v_0 + t_c a_0)^2 \quad (14)$$

$$= \frac{d}{dt}(v_0 \cdot v_0 + 2t_c v_0 \cdot a_0 + a_0 \cdot a_0 t_c^2)$$

$$= 2(v_0 \cdot a_0 + a_0 \cdot a_0 t_c).$$

By solving for $t_c$, a curve reaches its maximum curvature value at:

$$t_c = \frac{-v_0 \cdot a_0}{a_0 \cdot a_0}. \quad (15)$$

Maximum Curvature Time

Suppose three points are given for interpolation: $r_0$, $r_c$, $r_1$, where $r_c$ lies exactly at the point of maximum curvature along the quadratic Bézier curve. From equation (3) it may be noted that the curve interpolates the three points exactly for any time value $t_c \in [0, 1]$. Thus a time value of $t_c \in [0, 1]$ may be sought for which the quadratic Bézier curve reaches a local curvature maximum at time $t_c$ (i.e. that satisfies equation (15)).

Using equation (10) and equation (3), velocity vectors for the new curve may be expressed as:

$$v_0 = -\frac{r_{c,0} - t_c^2 r_{1,0}}{t_c(1-t_c)} \quad (16)$$

$$v_1 = -\frac{r_{c,1} - (1-t_c)^2 r_{1,0}}{t_c(1-t_c)}. \quad (17)$$

Here the notation $r_{i,j}$ is used to denote a difference of positions, i.e., $r_{i,j} = r_i - r_j$. Acceleration may be computed using equations (9) and (3) as follows:

$$a_0 = -\frac{r_{c,0} + r_{c,1} + (1-t_c)^2 r_{1,0}}{t_c(1-t_c)} \quad (18)$$

which is constant across the curve. Finally, combining equation (15) with the expressions for velocities (16) and acceleration (18), an expression may be obtained for the time $t_c$ at which the maximum curvature occurs in the quadratic Bézier:

$$t_c = \frac{1}{2} \frac{(r_{c,0} - t_c^2 r_{1,0}) \cdot (r_{c,0} - t_c r_{1,0})}{(r_{c,0} - t_c r_{1,0}) \cdot (r_{c,0} - t_c r_{1,0})}. \quad (19)$$

Equation (19) is a cubic equation:

$$r_{1,0}^2 t_c^3 - 3 r_{c,0} \cdot r_{1,0} t_c^2 + (2 r_{c,0}^2 + r_{c,0} \cdot r_{1,0}) t_c - r_{c,0}^2 = 0 \quad (20)$$

which can be solved using either the cubic formula or a numerical solver. For simplicity a few iterations of Halley's method may be used which provides cubic convergence to the solution. Thus, a solution is now obtained to a three point quadratic Bézier κCurve. To summarize, given any three points $r_0$, $r_c$ and $r_1$ where $r_c$ is defined to be a location of maximum curvature, equation (20) may be solved to compute the maximum curvature time $t_c$, and then solve for the location of the middle Bézier control point $r_m$ using equation (3).

Proof of Single Solution

It should be noted that the cubic equation (20) possesses a single real root within the time domain of interest $0 \le t \le 1$. This is the case since, as indicated by (12), a quadratic Bézier curve follows a trajectory equivalent to that of an object moving under constant acceleration, which is known to be a parabolic path. As such, there can only be a single curve maximum. This may be proved directly by exploring the nature of the roots of the cubic equation, which may be readily seen by rewriting the equation as $$f(t) = t^3 - 3\lambda \cos(\theta) t^2 + \lambda (2\lambda + \cos(\theta)) t - \lambda^2 = 0 \quad (21)$$

where $$\lambda = |r_{c,0}|/|r_{1,0}| \quad (22)$$

and $$\cos(\theta) = r_{1,0} \cdot r_{c,0} / (|r_{c,0}| |r_{1,0}|). \quad (23)$$

The values of $f(t)$ at the two endpoints, $t=0$ and $t=1$, $$f(0) = -\lambda^2 \quad (24)$$

and $$f(1) = 1 - 2\lambda \cos(\theta) + \lambda^2 = (1-\lambda)^2 + (2\lambda \sin(\theta/2))^2 \quad (25)$$

indicate that, ignoring the trivial special case for which $\lambda=0$ and $t_c=0$, the function $f(t)$ is strictly negative at $t=0$ and, ignoring the special case for which $\lambda=1$, $\lambda=0$ and $t_c=1$, it is strictly positive at $t=1$. It follows that there is at least one real root lying between $t=0$ and $t=1$.

It may now be shown that there is only a single real root. The alternative situation of three real roots can be ruled out as follows. Assume that there are actually three real roots in the designated range. Then the derivative function, $df(t)=dt$ must have two zeroes in that range and the second derivative function $d^2 f(t)/dt^2$ must also vanish in the range. The latter condition implies:

$$d^2 f(t)/dt^2 = 6(t - \lambda \cos(\theta)) = 0 \quad (26)$$

which implies $$0 \le \tau \le \quad (27)$$

where the variable $\tau$ is defined as $$\tau = \lambda \cos(\theta). \quad (28)$$

The requirement that the derivative function be zero, $$df(t)/dt = 3t^2 - 6\lambda \cos(\theta) t + \lambda(2\lambda + \cos(\theta)) = 0 \quad (29)$$

produces the two roots $$t \pm = \tau \pm \sqrt{\tau^2 - (2\lambda + \tau)/3}. \quad (30)$$

The term inside the square root can be recast as $$-[\tau(1-\tau) + 2\lambda^2 \sin^2(\theta)]/3 \quad (31)$$

which, ignoring the special cases mentioned above, is negative, with the implication that there are no real roots of the derivative function in the desired range of t. The assumption of three real roots is thus invalid, and there is only one single real root of our cubic equation (21) lying within this desired range.

Note also that if $\lambda > 0$ then the cubic cannot have a root at $t=0$. Thus, as long as $r_0$ and $r_c$ are distinct $t_c$ will be bounded away from 0. Likewise, by symmetry, if $r_1$ and $r_1$ are distinct $t_c$ will be bounded away from 1.

Composite Quadratic Bézier κCurves

Figure 7:
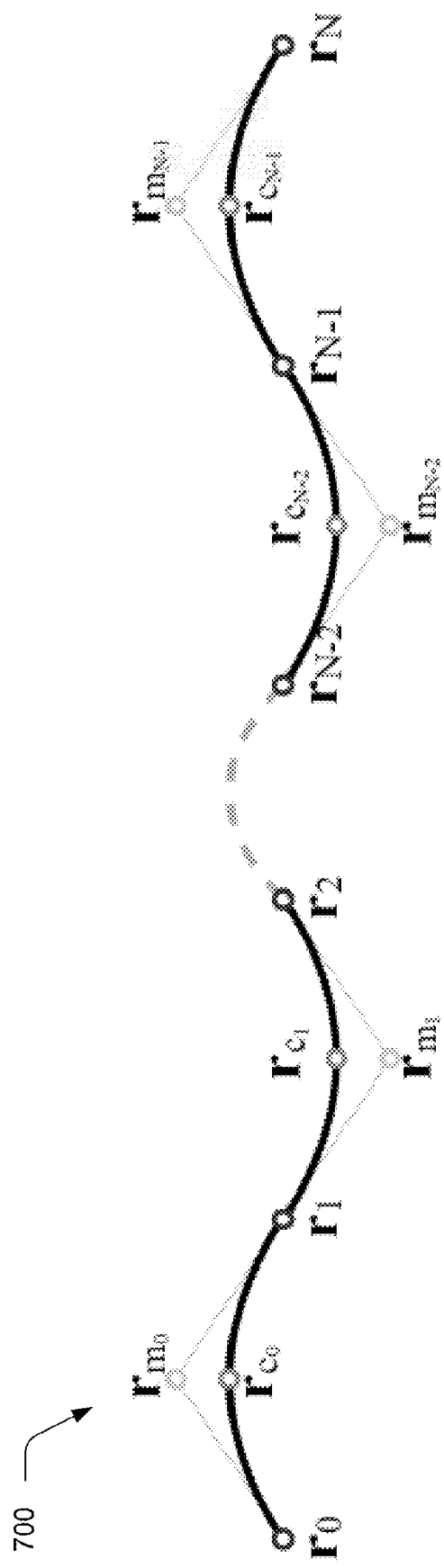
FIG. 7 shows an example of construction of an example of a composite curve in which a longer κCurve is constructed by composing together multiple quadratic Bézier segments with G1 continuity.

The above discussion detailed how to construct a three point quadratic Bézier κCurves. In this section, the discussion involves how to connect multiple quadratic Bézier segments together to form C1 continuous κCurves. FIG. 7 shows an example 700 of construction of an example of a composite curve in which a longer κCurve is constructed by composing together multiple quadratic Bézier segments with G1 continuity.

For N maximum curvature points there are N quadratic Bézier curve segments and N corresponding constraint equations. To simplify the later equations, the quadratic Bézier coefficients are defined as follows:

$$\alpha_i = (1 - t_{c_i})^2$$

$$\beta_i = 2 t_{c_i} (1 - t_{c_i})$$

$$\gamma_i = t_{c_i}^2 \quad (32)$$

where $t_{c_i}$ denotes the maximum curvature time for each of the N specified maximum curvature locations, each of which is indexed by index i.

For each quadratic Bézier curve, the coupled equations may be written as follows:

$$\alpha_0 r_0 + \beta_0 r_{m_0} + \gamma_0 r_1 = r_{c_0} \quad (33)$$

$$\alpha_1 r_1 + \beta_1 r_{m_1} + \gamma_1 r_2 = r_{c_1}$$

$$\dots$$

$$\alpha_{N-1} r_{N-1} + \beta_{N-1} r_{m_{N-1}} + \gamma_{N-1} r_N = r_{c_{N-1}}$$

G1 continuity requires that the tangent directions and magnitudes (velocities) are continuous at the joining point between curve segments. This condition implies that the Bézier ends points are halfway between their adjacent middle control points:

$$r_1 = (r_{m_0} + r_{m_1})/2 \quad (34)$$

$$r_2 = (r_{m_1} + r_{m_2})/2$$

$$\dots$$

$$r_N - 1 = (r_{(N-2)} + r_{(N-1)})/2$$

To formulate the solution, the middle control points are solved from which solution to the Bézier endpoints may then be inferred. Using Equations 33 and 34, this approach yields, for these control points, the recurrence relation $$\frac{1}{2}\gamma_n r_{m_{n+1}} + \left(\frac{1}{2}\alpha_n + \beta_n + \frac{1}{2}\gamma_n\right)r_{m_n} + \frac{1}{2}\alpha_n r_{m_{n-1}} = r_{c_n} \quad (35)$$

The constraint of the known boundary endpoints, $r_0$ and $r_{N-1}$ leads to the equations at the boundaries $$\frac{1}{2}\gamma_0 r_{m_1} + \left(\beta_0 + \frac{1}{2}\gamma_0\right)r_{m_0} = r_{c_0} - \alpha_0 r_0 \quad (36)$$

and $$\frac{1}{2}\alpha_{N-1} r_{m_{N-2}} + \left(\beta_{N-1} + \frac{1}{2}\alpha_{N-1}\right)r_{m_{N-1}} = r_{c_{N-1}} - \gamma_{N-1} r_{N-1} \quad (37)$$

Together these yield the matrix equation $Ax_m = b$ which can be solved for the unknown vectors $$X_m = [r_{m_0}, r_{m_1}, r_{m_2}, \ldots, r_{m_{N-1}}] \quad (38)$$

in terms of the known constraint vectors b. The matrix has the tri-diagonal form:

$$A = \begin{bmatrix} \beta_0 + \frac{\gamma_0}{2} & \frac{\gamma_0}{2} & 0 & 0 & \ldots \\ \frac{\alpha_1}{2} & \beta_1 + \frac{\alpha_1 + \gamma_1}{2} & \frac{\gamma_1}{2} & 0 & \ldots \\ 0 & \frac{\alpha_2}{2} & \beta_2 + \frac{\alpha_2 + \gamma_2}{2} & \frac{\gamma_2}{2} & \ldots \\ 0 & 0 & \frac{\alpha_3}{2} & \beta_3 + \frac{\alpha_3 + \gamma_3}{2} & \ddots \\ \vdots & \vdots & \vdots & \ddots & \ddots \end{bmatrix} \quad (39)$$

Note that, apart from the first and last rows, the sum of all elements on a row is unity from the completeness relation: $\alpha_n + \beta_n + \gamma_n = 1$. Also, the diagonal elements, which are equivalent to $(1+\beta_n)/2$, range in value from ½ to ¾. The maximum value of ¾ occurs when the corresponding maximum curvature time is ½. Furthermore, the matrix is diagonally dominant and, as long as none of the time parameters have values of 0 or 1, then the matrix is strictly diagonally dominant. In such cases, the matrix is known to be non-singular ($\det(A) \neq 0$) from the Levy-Desplanques theorem.

Algorithm for Quadratic κCurves

Figure 8:
FIG. 8 depicts an optimization scheme that may be formulated as shown in an example algorithm.

The system described above is non-linear in nature. Note that construction of the matrix A and right side vector b assumes knowledge of the maximum curvature times for each of the maximum curvature points. Computing maximum curvature times $t_{c_i}$ involves knowledge of the locations of the Bézier endpoints $r_i$, which are the solutions to the matrix system. This non-linear dependency prevents formulation of an analytic solution. Instead, an optimization scheme may be formulated as shown in an example algorithm 800 shown in FIG. 8.

The analysis begins by estimating the initial positions $r_i$ of the curve by averaging the adjacent maximum curvature points. The inner loop involves updating estimates for the maximum curvature times followed by updating the coordinate positions by solving the matrix equation described above. The subroutine "computeMaxCurvatureTime" solves cubic equation (20). An intuitive understanding is that time estimates may be improved and then used to produce improved locations. These locations may then be used to re-compute a new set of time estimates and so forth until the system reaches convergence. A variety of different convergence criteria may be used, such as when the time values $t_{c_i}$ remain nearly unchanged during successive iterations.

Locality for Collinear Constraint Points

The quadratic Bézier formulation described above implies a global solution. For such a solution, as the number of points increases on the curve the corresponding computation grows. Furthermore the global nature of the solution suggests that local changes to the interpolating points will have a global impact on the shape of the curve. Such behavior may be undesirable both from a performance perspective and from a design perspective in some instances. In practice, the solutions were found to be stable and local, with non-local effects diminishing as one moves further along the path from Bézier segment to Bézier segment. In this section, theoretical support is provided for these observations by focusing on a special arrangement of points which illustrate an oscillatory behavior in a particular case but which, in the more usual case, supports an exponentially damped behavior.

This character of the propagation of a change to the curve can be appreciated by considering the particular example of a curve formed by a set of collinear κPoints, where this notation of κPoints is used to refer to the maximum curvature points. The points may be taken to all lie along a horizontal line with vertical axis coordinate value of zero. Likewise, the last curve endpoint will also be so constrained. For instance, imagine a long chain of maximum curvature points in which the behavior of a portion is considered that does not include either endpoint. The κPoints are then of the form:

$$r_{c_n} = (x_{c_n}, 0). \quad (40)$$

A solution of the form is then posited:

$$r_{m_n} = (\zeta_n, \eta_n) = (\zeta_n, (-\omega)^n \delta_y). \quad (41)$$

Such a solution has, for positive λ, an exponentially decreasing amplitude. For ω equal to unity the behavior is oscillatory. This oscillatory behavior is restricted to a particular arrangement of the κPoint curve. From (35) it may be found, upon subtracting the same equation with an index, n, decremented by unity, and with application of the completeness relations, that the following holds:

$$\zeta_n = x_{c_n} + \frac{1}{2}(\alpha_n \delta\zeta_n - \gamma_n \delta\zeta_{n+1}) \quad (42)$$

$$\eta_n \frac{1}{2}(\alpha_n S \eta_n - \gamma_n \delta\eta_{n+1}) \quad (43)$$

which uses the definitions $$\delta\zeta_n = \zeta_n - \zeta_{n-1} \quad (44)$$

and $$\delta\eta_n = \eta_n - \eta_{n-1}. \quad (45)$$

The imposed oscillatory decaying solution for η leads to the following form for $\delta\eta_n$, $$\delta\eta_n = \eta_n(1+\omega)/\omega \quad (46)$$

and, equivalently, for $\delta\eta_{n+1}$:

$$\delta\eta_{n+1} = -\eta_n(1+\omega). \quad (47)$$

Thus, $$\eta_n = \frac{1}{2}(1+\omega)(\alpha_n/\omega + \gamma_n)\eta_n \quad (48)$$

to arrive at the following condition:

$$1 = \frac{1}{2}(1 + \omega)(\alpha_n/\omega + \gamma_n) \qquad (49)$$

which is satisfied if there exists an oscillatory or oscillatory decaying solution of the collinear κPoint problem. For the special oscillatory case for which the magnitude of the vertical component of the Bézier control points oscillate above and below the line of κPoints with constant amplitude, the "decay" factor ω is unity which leads to the requirement:

Oscillation: $1=\alpha_n+\gamma_n$ (50)

which is satisfied for two values of the corresponding maximum curvature times, namely at t=0 and t=1. The solution t=0 is consistent with the cubic time equation, which constrains the constraint points to indeed be at points of maximum curvature. For, in this case, the cubic equation reduces to $-\lambda^2=0$ (51)

which is true when the maximum curvature point lies precisely at the location of its t=0 endpoint. On the other hand, the situation t=1 leads to the cubic equation $1-2\lambda \cos(\theta)+\lambda^2=0$ (52)

which has a real solution for λ only for the special case λ=1 and θ=0. In this situation, the maximum curvature point lies precisely at its t=1 endpoint.

The amplitude of oscillation is limited by the properties of the quadratic Bézier curve. Consider a quadratic Bézier curve segment with endpoint $r_0$ free to vary but with the maximum curvature control point $r_c$ and the endpoint $r_1$ both fixed. Without loss of generality, these latter points may be placed on a horizontal line with spacing between them of $d=r_{c,1}=|r_{c,1}|$. The point $r_c$ is placed at the coordinate system origin. The solution for the maximum vertical deviation of the curve portion which lies between $r_c$ and $r_1$ is given by the following form for the first endpoint: $r_0=(0, y_0)$ with the time parameter, $t_c$, for the maximum curvature point expressed as:

$$t_c = \frac{y_0^2 + y_0^{2/3} - y_0^{4/3}}{1 - y_0^2}. \qquad (53)$$

The curve segment vertical extent is given by:

$$\delta Y = \frac{1}{4}y_0^{1/3}\frac{1 - y_0^{2/3} + y_0^{4/3}}{1 + y_0^2}d \qquad (54)$$

and scales linearly with the point spacing distance d. This expression is maximized by the choice $$y_0 = 1, t_c = \frac{1}{2}$$

and the maximum curve vertical deviation $$\delta\gamma_{max} = \frac{1}{8}d.$$

The maximum vertical amplitude, $\eta_{max}$, of the middle Bézier control point is given as $$\eta_{max} = \frac{1}{2}d.$$

In other words, the maximum curve segment vertical "wiggle" when moving the first endpoint around is limited by one eighth of the point spacing, d, which amplitude is one quarter of the maximum vertical amplitude of the Bézier control point. This is a result for a single quadratic Bézier curve. As more curves are added to such a path this maximum "wiggle" is generally reduced, typically in an exponentially decaying fashion, as indicated by the collinear constraint point example.

Turning back to the general oscillatory decaying solution, after expressing $\alpha_n$ and $\gamma_n$ explicitly as functions of the corresponding time parameters, the following equation which relates $t_n$ to ω is found:

$$1 = \frac{1}{2}(1 + \omega)((1 - t_n)^2\omega + t_n^2) \qquad (55)$$

which has the solution $t_n=(1-\sqrt{(\omega)})/(1+\omega).$ (56)

The time parameter is thus independent of the point index and hence is constant along the curve, apart from endpoints which we are not including here. The requirement $0 \leq t_n \leq 1$ constrains ω also to lie between 0 and 1. An interesting value for t is $$t = \frac{1}{2}$$

which occurs for a value of $\omega=3-2\sqrt{(2)}=0.171573\ldots$. In this case the Bézier control point vertical amplitude dies off exponentially for increasing point index as approximately $(0.171573\ldots)^n=\exp(-1.76275n)$. In general, the closer t is to zero the slower is the decay rate, and the closer to unity the larger is this rate.

The horizontal components are now addressed to understand the dependence of the solutions on the point spacing. Focus is made on the situation of equal horizontal spacing, $\delta\zeta$, of the Bézier curve middle control points:

$\delta\zeta_n=\delta\zeta_{n+1}=\delta\zeta_n$ (57)

This results in $$\zeta_n = x_{c_n} + \frac{1}{2}(\alpha_n - \gamma_n)/(1 + \omega)\delta\zeta \qquad (58)$$

$$= x_{c_n} + \frac{1}{2}\left(w + 2\sqrt{\omega} - 1\right)/(1 + \omega)\delta\zeta. \qquad (59)$$

The last term describes the deviation of the Bézier middle control point's horizontal position relative to its associated κPoint. The oscillatory solution with $t_n=0$, ω=1 thus has the Bézier control points spaced halfway in between the κPoints, i.e., the offset is half of the κPoint spacing.

$$t_n = 0: \zeta_n = x_{c_n} + \frac{1}{2}\delta\zeta. \quad (60)$$

The special case mentioned previously of $$t_n = \frac{1}{2}$$

does not result in an offset. For this exponentially damped case the Bézier middle control points lie at the same horizontal location as the maximum curvature constraint points.

$$t_n = \frac{1}{2}\delta_n = x_{c_n}. \quad (61)$$

Figure 9:
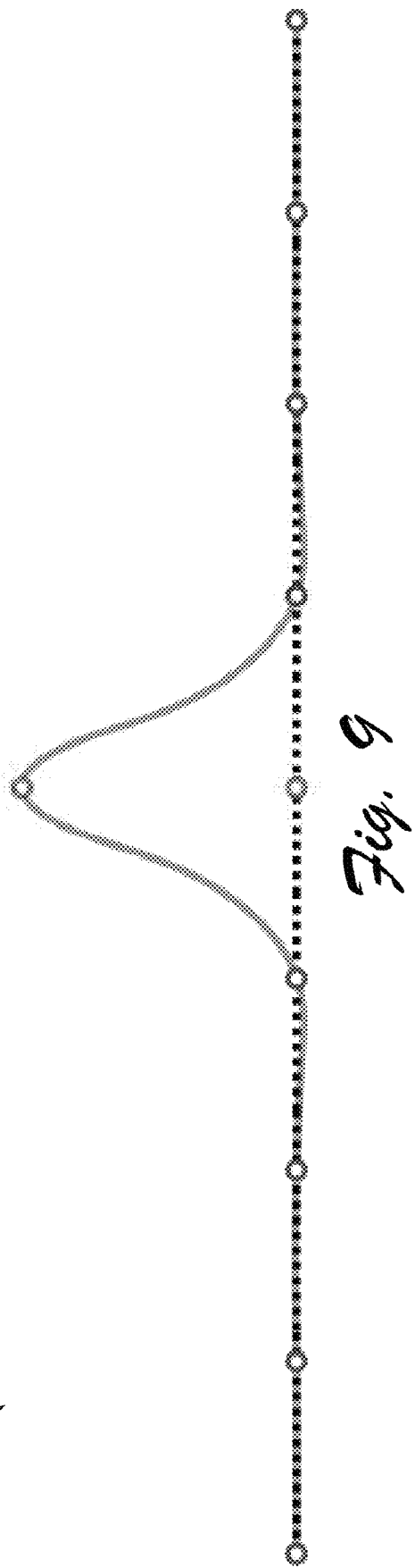
FIG. 9 depicts an example of local behavior of a mode.

Thus, an example curve is described which supports exponential decay of the curve amplitudes as well as a pathological case of oscillation at constant limited amplitude. So, while the quadratic Bézier formulation leads to a global solution with the potential for non-local propagation of curve changes, in practice local curve changes are greatly damped, e.g., with an exponential falloff for a collinear arrangement of points. As seen in an example 900 of FIG. 9, the model's visible behavior is quite local in nature. A local change to the curve tends to impact the curve in a limited local region.

Example Implementation

A variety of different cubic solvers may be used to solve equation (20), such as a direct cubic solver, as well as Halley's method. In practice, Halley's method provided the best level of performance as well as stability. This in part comes from the ability to seed this method with an initial guess which lies close to the true solution as follows:

$$t_c = |r_{c,0}|/(|r_{c,0}| + |r_{c,1}|) \quad (62)$$

The observation here is that the interpolating quadratic closely follows the polyline that passes through $r_0$, $r_c$, $r_1$. The initial guess, for instance, may even be exact when the three points are collinear. In one or more implementations, iterations of Halley's method are performed until the change in $t_c$ falls below 1.0e-6.

To solve the matrix system A, a basic implementation of a sequential tri-diagonal solver is used which has a well-known running time of O(n) as well as O(n) storage. For the convergence criteria in Algorithm 1 in the example 800 of FIG. 8, iterations are performed until the change in computed max curvature times $t_{c_i}$ falls below 1.0e-6 for every quadratic Bézier segment.

Figure 10:
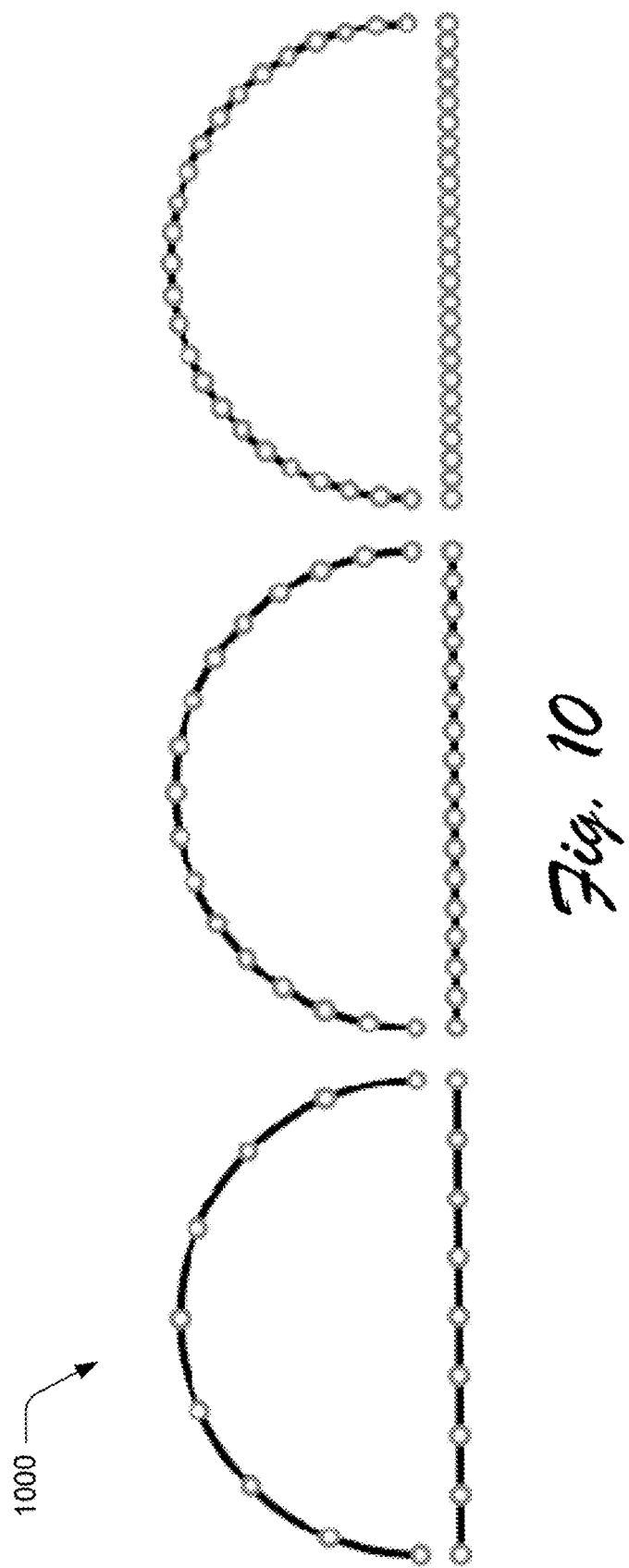
FIG. 10 depicts an example system for solving κCurves containing up to ten thousand randomly generated points.

In the example 1000 of FIG. 10, an example system for solving κCurves containing up to ten thousand randomly generated points in the interval [0, 1] is shown. Note that the solution time is all sub-second and the performance scaling is nearly linear in the size of the curve due to the rate of convergence and efficiency of our chosen matrix solver.

Figure 11:
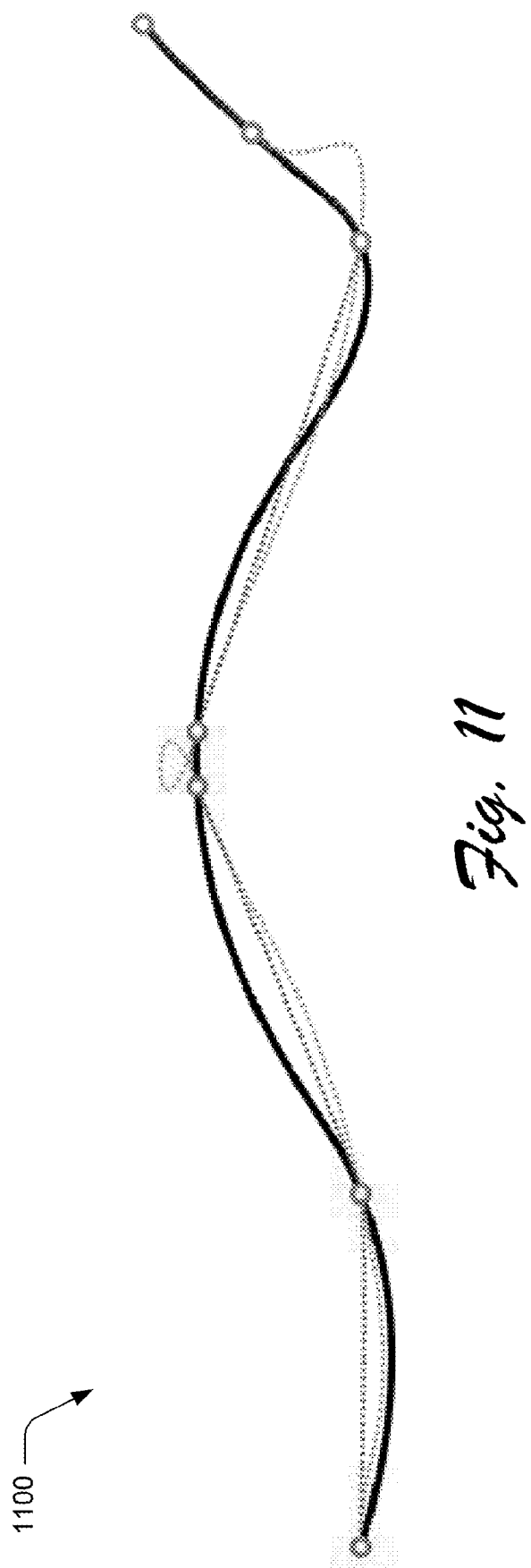
FIG. 11 depicts an example of a comparison of a spline curve using the techniques described herein with a cubic Catmull-Rom spline interpolation technique.

FIG. 11 depicts an example 1100 of a comparison of a spline curve using the techniques described herein with a cubic Catmull-Rom spline interpolation method [Catmull and Rom 1974]. The choice of parameterization may impact the quality of results from the Catmull-Rom model. FIG. 11 demonstrates a configuration where a default choice of tension behaves poorly creating loops and wiggles (shown in phantom) between the control vertices whereas the techniques described herein (shown as a solid line) produce smooth and intuitive results. Although a user may globally adjust the tension parameter to avoid these loops and wiggles in the conventional technique, this reduces the fairness of the curve by concentrating high curvature at the control vertices. A user may also manually adjust the tension at each vertex separately to produce better results, but this involves manually tuning.

Aesthetic G2 Cubic Bézier Curves

In the previous sections techniques are described that may be used to formulate C1 continuous quadratic κCurves. While the solution to quadratic κCurves provides an elegant form it is often desirable to reach a higher order continuity. For CAD applications, for instance, G2 continuity is normally considered a minimal requirement. For two dimensional drawing packages, however, such continuity is not necessary. Furthermore, it well known that higher order smoothness does not always equate to more aesthetic curves.

For two dimensional drawing systems, the aesthetics and control-ability of the curve representation plays a bigger role than the overall continuity. Unfortunately there is no good known measure of fairness by which to evaluate curves, although suggestions have been proposed like minimizing the total variation of curvature. Minimizing curvature variation leads to overly rounded or circular curves which do not necessarily meet an artist's expectations. It is noted that the quadratic κCurves, while producing nice looking curves may have rapidly changing curvature. Thus, a curve that possesses higher order continuity (i.e., G2) may be pursued with less variation of curvature to produce a more visually pleasing curve model.

To do this, cubic Bézier curves may be employed. Cubic Bézier curves form the basis for many curve modeling packages and are represented in standard rendering systems. Libraries exist to render cubic Bézier curves efficiently on a graphics processing unit. As shown below the mathematical requirements for such curves, however, may be complicated to analyze. To tackle these issues, techniques are described in the following to solve the problem and demonstrate under most conditions G2 curves may be generated that are both aesthetic, have low variation of curvature, with maximum curvatures located near the control vertices.

A cubic Bézier curve takes the form:

$$r(t) = (1-t)^3 r_0 + 3t(1-t)^2 r_{m0} + 3t^2(1-t) r_{m1} + t^3 r_1 \quad (63)$$

With its first and second derivatives given by:

$$v(t) = -3(t^2 - 2t + 1) r_0 + (9t^2 - 12t + 3) r_m - (9t^2 + t) r_n + 3t^2 r_1 \quad (64)$$

$$a(t) = 6(1-t) r_0 + 6(3t-2) r_m + 6(1-3t) r_n + 6t r_1 \quad (65)$$

$$a'(t) = -6 r_0 - 12 r_m - 12 r_n + 6 r_1 \quad (66)$$

The velocities and acceleration at the start and end may be expressed as follows:

$$v(0) = 3(r_m - r_0) \quad (67)$$

$$v(1) = 3(r_1 - r_n) \quad (68)$$

$$a(0) = 6(r_0 - 2r_m + r_n) \quad (69)$$

$$a(1) = 6(r_1 - 2r_n + r_m) \quad (70)$$

The curvatures at t=0 and t=1 are now given:

$$\kappa(0) = \frac{2v(0) \times a(0)}{3\|v(0)\|^3} \quad (71)$$

-continued $$\kappa(1) = \frac{2v(1) \times a(1)}{3\|v(1)\|^3} \tag{72}$$

This further simplifies to:

$$\kappa(0) = \frac{2r_{m0} \times r_{0n}}{3\|3r_{m0}\|^3} \tag{73}$$

$$\kappa(1) = \frac{2r_{n1} \times r_{1m}}{3\|3r_{1n}\|^3} \tag{74}$$

Assume two points $r_0$ and $r_1$ are given along with unit length tangent directions $T_0$ and $T_1$ at the two points respectively. Suppose also designated curvatures $\kappa_0$ and $\kappa_1$ at $r_0$ and $r_1$. The following two expressions may then be written:

$$\frac{2\lambda_0 T_0 \times r_{0n}}{3\|\lambda_0 T_0\|^3} = \kappa_0 \tag{75}$$

$$\frac{2\lambda_1 T_1 \times r_{1m}}{3\|\lambda_1 T_1\|^3} = \kappa_1 \tag{76}$$

Simplifying these expressions the following is obtained:

$$\frac{\lambda_0 T_0 \times r_{0n}}{\lambda_0^3 \|T_0\|^3} = \frac{3}{2}\kappa_0 \tag{77}$$

$$\frac{\lambda_1 T_1 \times r_{1m}}{\lambda_1^3 \|T_1\|^3} = \frac{3}{2}\kappa_1 \tag{78}$$

Which further reduces to:

$$T_0 \times r_{0n} = \frac{3}{2}\kappa_0 \lambda_0^2 \tag{79}$$

$$T_1 \times r_{1m} = \frac{3}{2}\kappa_1 \lambda_1^2 \tag{80}$$

expanding:

$$T_0 \times (r_0 - (r_1 + \lambda_1 T_1)) = \frac{3}{2}\kappa_0 \lambda_0^2 \tag{81}$$

$$T_1 \times (r_1 - (r_0 + \lambda_0 T_0)) = \frac{3}{2}\kappa_1 \lambda_1^2 \tag{82}$$

Multiplying through:

$$T_0 \times r_{01} - \lambda_1 T_0 \times T_1 = \frac{3}{2}\kappa_0 \lambda_0^2 \tag{83}$$

$$T_1 \times r_{10} - \lambda_0 T_1 \times T_0 = \frac{3}{2}\kappa_1 \lambda_1^2 \tag{84}$$

Finally:

$$\left(\frac{3}{2}\kappa_0\right)\lambda_0^2 - (T_0 \times T_1)\lambda_1 - (T_0 \times r_{10}) = 0 \tag{85}$$

-continued $$\left(\frac{3}{2}\kappa_1\right)\lambda_1^2 - (T_0 \times T_1)\lambda_0 - (T_1 \times r_{10}) = 0 \tag{86}$$

The appropriate tangent scaling factors $\lambda_0$ and $\lambda_1$ may now be solved by first solving for $\lambda_1$ in terms of $\lambda_0$ and then using this value to arrive at a depressed fourth order polynomial:

$$(\alpha_0^2 \beta_0)\lambda_0^4 + (2\alpha_0 \alpha_2 \beta_0)\lambda_0^2 + (\beta_1 \alpha_1^2)\lambda_0 + (\beta_2 \alpha_1^2 + \alpha_2^2 \beta_0) = 0 \tag{87}$$

where:

$$\alpha_0 = \frac{3}{2}\kappa_0 \tag{88}$$

$$\alpha_1 = -T_0 \times T_1 \tag{89}$$

$$\alpha_2 = -T_0 \times r_{10} \tag{90}$$

$$\beta_0 = \frac{3}{2}\kappa_1 \tag{91}$$

$$\beta_1 = -T_0 \times T_1 \tag{92}$$

$$\beta_2 = -T_1 \times r_{10} \tag{93}$$

Heuristic System Techniques

A pragmatic approach may be taken to solve for a G2 cubic curve that has curvature concentrated at the control points. One could formalize a large non-linear optimization that simultaneously seeks a solution to all of the free parameters that satisfy the systems of equations given by (85) and (86). This approach is expensive and the search space is quite large. Instead a heuristic may be used to estimate the tangent directions and curvatures for the ends of the cubic Bézier curves.

Given fixed tangent directions ($T_0$ and $T_1$), and desired curvatures ($\kappa_0$ and $\kappa_1$) at both ends of the curve, the two tangent scaling terms $\lambda_0$ and $\lambda_1$ may be solved. Note that equation (87) becomes a quartic function. Thus, there may be as many as four solutions that satisfy the G2 property. Another way to recognize this is to see that equations (85) and (86) form parabolas and that an intersection of these parabolas is sought. The solution space, however, is restricted to $\lambda_0, \lambda_1 > 0$, i.e., the scaling of the tangent vectors is positive. This leads to the problem of determining which of the valid solutions to choose and more importantly what to do in the case a solution does not exist.

Tangent and Curvature Assignment

A simple heuristic may be used to assign target curvatures and tangents. At each control point $p_i$, a quadratic κCurve is fit through the sequence of control points $p_i-2 \ldots p_i+2$ to compute the tangent vector $T_i$ and curvature estimate $k_i$ at point $p_i$. A wider window around pi may also be used to compute the quadratic κCurve at the expense of having a less local model. By restricting the window, local changes to the control points are ensured to result in only local changes to the curves.

Even though the quadratic κCurve tangent estimates are good, the variation of curvature may be higher than would be desirable in some instances. For example, if a sequence of points lie along a circle an artist might expect that the resulting curve be circular in nature, i.e., have zero variation in curvature. However, when the control points do not lie along a circle a user may prefer curves with a variation of curvature more similar to that of the quadratic κCurve.

This motivates use of blended model techniques for assigning curvatures to these points. Co-circular points will be assigned curvature values that match one over the radius of the circle. For non-circular points the quadratic kappa curve curvature estimate is used. Points that are in between get of blended form of the two curvature values. The process of blending curvature estimates may be referred to as fairing since it improves the aesthetic appeal of the resulting.

To accomplish this, a single blending factor (i.e., blending term) may be computed that is the product of three separate blending factors, e.g., base line blend, angle blend, and curvature blend. Each of these factors defines a condition which defines where the points lie in a circular pattern sufficient for using the circle curvature tangents and curvatures. For each term, the blend factor is one if the condition is met. Since the final blend factor is a product of all three, the circle estimates are used when all three conditions are sufficiently met. In addition, use control may be support of each blend factor by raising the factors to a power: $\gamma_i$. A user may adjust these factors to produce different blends. The following describes examples of these conditions in detail.

For the base line blend factor, each point $r_i$ is projected onto the segment $r_{i-1}$ and $r_{i+1}$. A condition may be imposed that the projected point $p(r_i)$ (where $p(\cdot)$ is the projection operator) ideally projects onto the midpoint of the segment given by $r_{i-1}$ and $r_{i+1}$. If it does the blending term is one. Conversely, if the projected point falls outside of the segment (or at the endpoints of the segment), the blending termin is dropped to zero. Let b baseline vector from $r_{i-1}$ to $r_{i+1}$, and $\hat{b}$ be it's normalized form. Then the baseline blend is given by:

$$baseLineBlend = \left(\max\left(1.0 - \frac{2|(r_i r_{i-1}) \cdot \hat{b} - \|b\|/2|}{\|b\|}, 0\right)\right)^{\gamma_0} \quad (94)$$

The next term to consider is the angular term. An ideal configuration would have the angle made between the two vectors $r_i r_i-1$ and $r_i r_i+1$ as exactly ninety degrees. Let $\hat{V}_0 = r_{i-1} r_i / \|r_{i-1} r_i\|$, $\hat{V}_1 = r_i r_{i+1} / \|r_i r_{i+1}\|$ The angle blending term becomes:

$$angleBlend = (\max(\hat{V}_0 \times \hat{V}_1, 0))^{\gamma_1} \quad (95)$$

For the curvature blending term, in practice it was found that using the circle curvature estimate at a given control point makes sense when the adjacent control points have similar circle curvatures. In other words, a sequence of points is to lie along the circle. A curvature blending function between two sets of curvatures which is symmetric may be defined as follows:

$$curvatureBlend(\kappa_0, \kappa_1) = \begin{cases} 0 & \text{if } \kappa_0 \kappa_1 < 0 \text{ else} \\ (\kappa_0/\kappa_1)^{\gamma_2} & \text{if } \kappa_0 < \kappa_1 \\ (\kappa_1/\kappa_0)^{\gamma_2} & \text{otherwise} \end{cases} \quad (96)$$

Let $\check{k}_{i-1}$, $\check{k}_i$, $\check{k}_{i+1}$, be the circle curvature estimate at $r_{i-1}$, $r_i$, $r_{i+1}$, respectively. The final combined curvature blend function is given by the product of: curvatureBlend ($\check{k}_{i-1}$, $\check{k}_i$), and curvatureBlend ($\check{k}_i$, $\check{k}_{i+1}$). Note if circle curvatures do not match on either side of control point $r_i$, the combined angle blending term is zero.

All three blending terms may be combined together, which is a product of four blending functions. For example, a variety of different choices may be made, such as $\gamma_0=1$, $\gamma_1=6$, and $\gamma_2=1$, but other choices are also contemplated given a user's taste in how aggressive the user wants the curves to pursue the more circularly rounded form.

Tangent and Curvature Assignment

After assigning target curvatures and tangent directions at each control point, the tangent magnitudes $\lambda_0$, $\lambda_1 > 0$ are solved using equation (87). Since this is a depressed quartic Ferrari's solution may be directed used to analytically solve for the real roots. For each of the real roots, solutions are pruned where either $\lambda_0 < 0$ or $\lambda_1 < 0$. From the remaining solutions, the solution with the largest smallest $\lambda$ is chosen, i.e., a preference is made for solutions where $\lambda$ factors are bounded away from zero.

In some instances, however, an admissible solution may not be found, such as when the tangents are in a "C" configuration, e.g., the resulting curve forms a "C" shape. The alternative "S" configuration leads to valid solutions. Under the "C" configuration, however, G2 continuity is abandoned. One technique involves seeking a solution that minimizes the deviation of curvatures at the two end points. This may be done in a straightforward manner by minimizing the sum of squared distances from the target curvatures and the solution curvatures subject to the inequality constraint $\lambda_0, \lambda_1 > 0$. In practice, however, running this optimization results in a solution where either $\lambda_0$ or $\lambda_1$ is near zero.

In another technique, the $\lambda$ scaling factor is fixed at the end of the curve with the smallest curvature magnitude. In one or more implementation, one third of the length of the baseline is used between the two control points. Given the $\lambda$ factor at one end of the curve, the other may be directed solved by imposing G2 at the higher curvature end of the curve. This strategy hides the G2 discontinuity at the least noticeable end of the curve. This approach is a reasonable choice since the failure cases are typically a result of having high curvature specified at one end of the curve and low curvature at the other.

As discussed it may not always be possible to have G2 continuity for a specified set of tangents, curvatures, and control point locations. Additionally, a problem may arise in that not all G2 solutions are aesthetic and desirable. Under some 'C' curve configurations the resulting curves satisfy G2, for instance, but the change in curvature at one end is so rapid that the result approaches a cusp like behavior whereas the resulting curve should follow the osculating circle near each endpoint.

In one or more implementations, techniques may be utilized to detect such cases and not allow the $\lambda$ scaling factors to fall below one over the radius of curvature at either end of the curve. If such a case happens, the curvature is clamped and the $\lambda$ scaling term is soled that satisfies G2 at the other end of the curve.

Example Procedures

The following discussion describes curve techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11.

Figure 12:
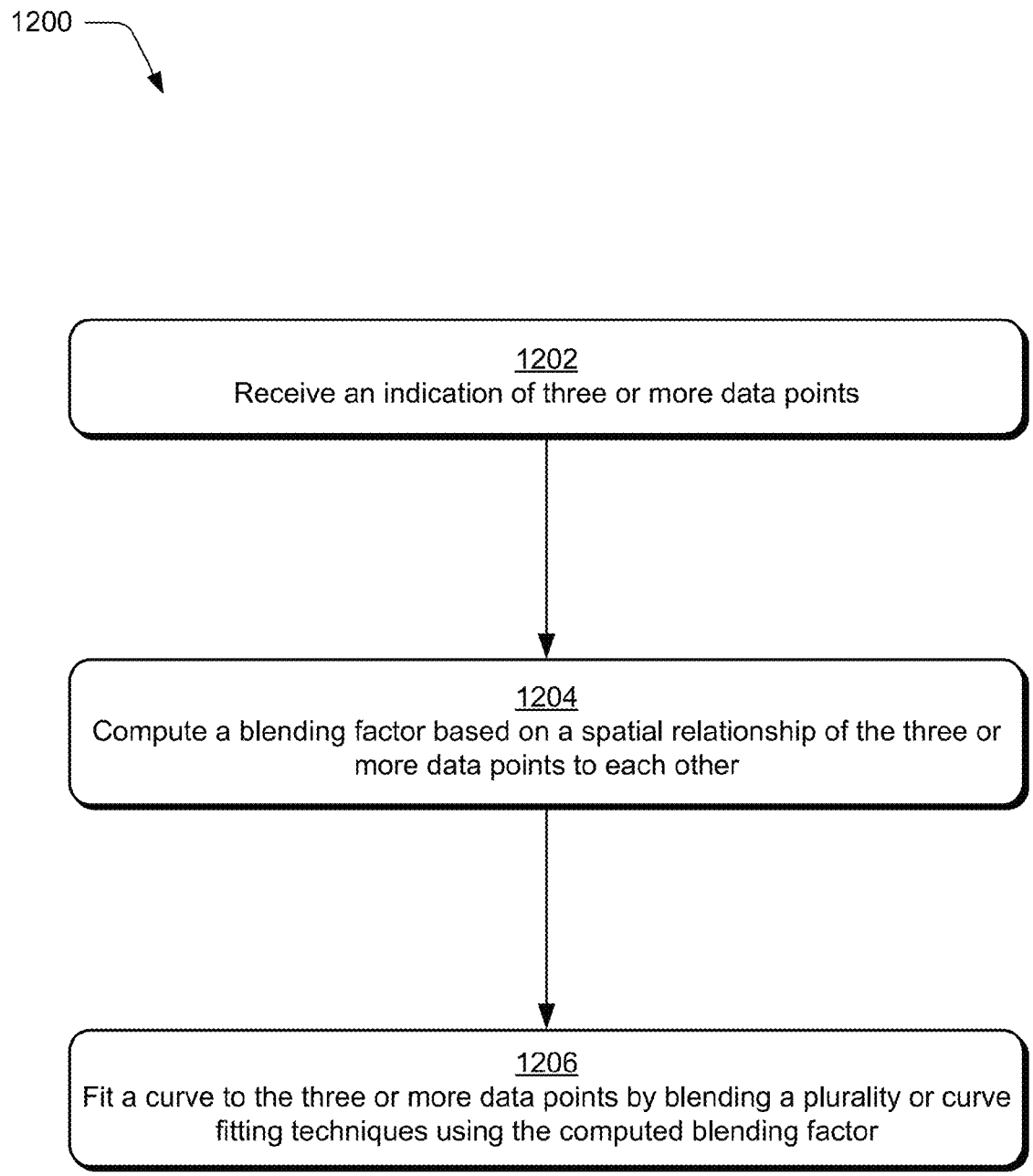
FIG. 12 is a flow diagram depicting a procedure in an example implementation in which a blending factor is utilized to fit a curve to three or more data points.

FIG. 12 depicts a procedure 1200 in an example implementation in which a blending factor is utilized to fit a curve to three or more data points. An indication is received of three or more data points (block 1202). The indication, for instance, may be received from a user through interacting with a user interface, obtained from a spreadsheet, remotely via a network, and so on.

A blending factor is computed based on a spatial relationship of the three or more data points to each other (block 1204). The three or more data points, for instance, may be arranged in a sequence. This sequence, and the spatial relationship of the data points to each other, may be used to compute a blending factor, such as based on one or more heuristics as previously described. Other examples that depend solely on a spatial relationship and not on the sequence are also contemplated.

A curve is fit to the three or more data points by blending a plurality or curve fitting techniques using the computed blending factor (block 1206). Continuing with the previous example, the blending factor may be used to assign weights to different ones of the curve fitting techniques and thus the curve fitting, and the techniques that are used to perform this fitting, may be based at least in part on the spatial relationship of the data points to each other.

Figure 13:
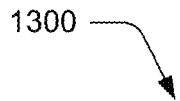
FIG. 13 is a flow diagram depicting a procedure in an example implementation in which one of a plurality of curve fitting techniques is chose to fit a curve to a plurality of data points.
Figure 13:

FIG. 13 depicts a procedure 1300 in an example implementation in which one of a plurality of curve fitting techniques is chose to fit a curve to a plurality of data points. A choice is made as to which of a plurality of curve fitting techniques to apply based on a spatial relationship of a plurality of data points to which a curve is to be fit (block 1302). The curve fitting module 108, for instance, may examine the plurality of data points 110 to determine a curve fitting technique that is likely to result in a curve that complies with a desired output of a user. This may be performed based on a spatial relationship of the data points, a source of the data points (e.g., input by a user, spreadsheet, type of data), and so forth.

The curve is fit to the plurality of data points using the chosen ones of the plurality of curve fitting techniques (block 1304). Continuing with the previous example, the chosen curve fitting technique may then be applied to form the curve. The choice may also include a choice of more than one curve fitting technique, and therefore in such an instance these techniques may be blended together to achieve a final result. A variety of other examples are also contemplated without departing from the spirit and scope thereof.

Example System and Device

Figure 14:
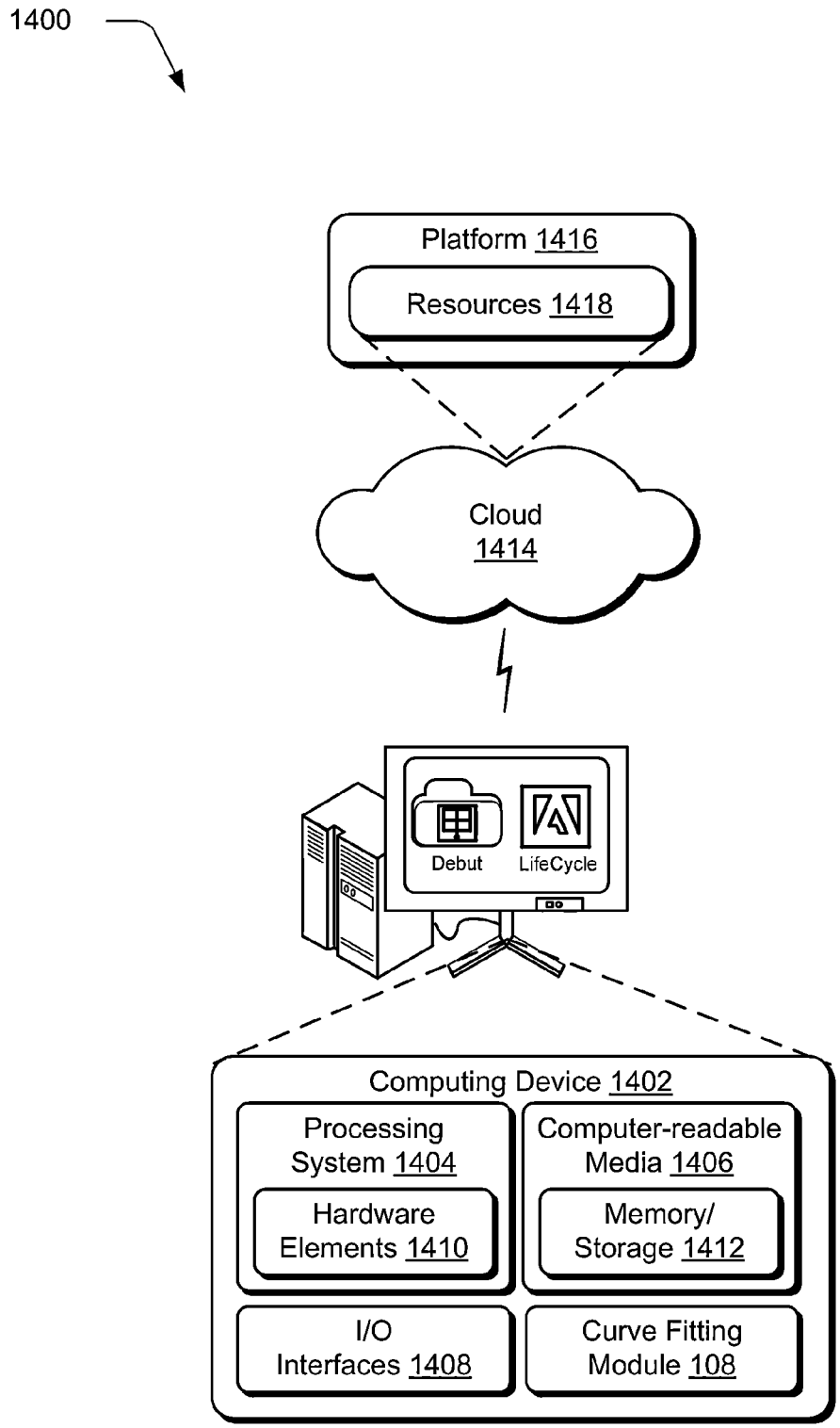
FIG. 14 illustrates an example system including various components of an example device that can be implemented as any type of computing device as described and/or utilize with reference to FIGS. 1-13 to implement embodiments of the techniques described herein.

FIG. 14 illustrates an example system generally at 1400 that includes an example computing device 1402 that is representative of one or more computing systems and/or devices that may implement the various techniques described herein. This is illustrated through inclusion of the curve fitting module 108, which may be configured to fit and/or manipulate curves involving data points. The computing device 1402 may be, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interface 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1406 is illustrated as including memory/storage 1412. The memory/storage 1412 represents memory/storage capacity associated with one or more computer-readable media. The memory/storage component 1412 may include volatile media (such as random access memory (RAM)) and/or nonvolatile media (such as read only memory (ROM), Flash memory, optical disks, magnetic disks, and so forth). The memory/storage component 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of a module that is executable by the computing device 1402 as software may be achieved at least partially in hardware, e.g., through use of computer-readable storage media and/or hardware elements 1410 of the processing system 1404. The instructions and/or functions may be executable/operable by one or more articles of manufacture (for example, one or more computing devices 1402 and/or processing systems 1404) to implement techniques, modules, and examples described herein.

The techniques described herein may be supported by various configurations of the computing device 1402 and are not limited to the specific examples of the techniques described herein. This functionality may also be implemented all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 may include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 may abstract resources and functions to connect the computing device 1402 with other computing devices. The platform 1416 may also serve to abstract scaling of resources to provide a corresponding level of scale to encountered demand for the resources 1418 that are implemented via the platform 1416. Accordingly, in an interconnected device embodiment, implementation of functionality described herein may be distributed throughout the system 1400. For example, the functionality may be implemented in part on the computing device 1402 as well as via the platform 1416 that abstracts the functionality of the cloud 1414.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   receiving, by the at least one computing device, an indication of at least three data points;
   determining, by the at least one computing device, a spatial relationship between the at least three data points;
   computing, by the at least one computing device, a blending factor without fitting a segment of a curve to the at least three data points based on the spatial relationship between the at least three data points, the blending factor specifying how a plurality of curve fitting techniques are to be weighted to fit the segment of the curve to the at least three data points;
   fitting, by the at least one computing device, the segment of the curve to the at least three data points by blending the plurality of curve fitting techniques to form the segment to the at least three data points using the weighting of the plurality of curve fitting techniques corresponding to the computed blending factor; and
   rendering, by the at least one computing device, the curve in a user interface.

2. A method as described in claim 1, wherein the plurality of curve fitting techniques include quadratic Bézier curve techniques, cubic Bézier curve techniques, and circle curve estimate techniques.

3. A method as described in claim 1, wherein the fitting includes computing a tangent direction and radius of curvature.

4. A method as described in claim 1, wherein the spatial relationship describes symmetry of the at least three data points to each other.

5. A method as described in claim 4, wherein the symmetry of the at least three data points to each other is based on whether for first, second, and third said data points that are defined in succession, whether the second said data point falls between two lines at respective first and third said data points that are perpendicular to a baseline defined between the first and third said data points.

6. A method as described in claim 1, wherein the spatial relationship describes flatness of the at least three data points to each other.

7. A method as described in claim 6, wherein the flatness of the at least three data points to each other is based on, for first, second, and third said data points that are defined in succession, nearness of the second said data point falls to a baseline defined by the first and third said data points.

8. A method as described in claim 1, wherein the spatial relationship is based at least in part on a sign of curvature of an adjacent said data point.

9. A method as described in claim 8, wherein the sign of curvature is employed by determining whether the sign of curvature of an adjacent said data point is different than a sign for a current said data point.

10. A method as described in claim 1, wherein the computing is performed for a window defining a number of data points positioned before and after a current said data point.

11. A system comprising:
at least one processor; and
at least one computer-readable storage media device comprising instructions, that, responsive to execution by the at least one processor, causes the at least one processor to perform operations comprising:
receiving an indication to fit a curve to a plurality of data points;
determining a spatial relationship between the plurality of data points;
blending a plurality of curve fitting techniques to perform the fitting of the curve through weighting of the respective curve fitting techniques of the plurality of curve fitting techniques without performing a prior curve fitting to the plurality of data points, the blending using at least one heuristic that is based on the determined spatial relationship between the plurality of data points that determines the weighting; and
rendering the curve in a user interface.

12. A system as described in claim 11, wherein the plurality of curve fitting techniques include quadratic Bézier curve techniques, cubic Bézier curve techniques, and circle curve estimate techniques.

13. A system as described in claim 11, wherein the heuristic employs a quadratic Bézier curve technique.

14. A system as described in claim 11, wherein the heuristic is based on a symmetry of the plurality of data points to each other is based on whether for first, second, and third said data points that are defined in succession, whether the second said data point falls between a baseline defined by the first and third said data points.

15. A system as described in claim 11, wherein the heuristic is based on a flatness of the plurality of data points to each other based on, for first, second, and third said data points that are defined in succession, nearness of the second said data point falls to a baseline defined by the first and third said data points.

16. A system as described in claim 11, wherein the heuristic is based on a determination of whether a sign of curvature of an adjacent said data point is different than a sign for a current said data point.

17. A system comprising:
at least one processor; and
at least one computer-readable storage media device comprising instructions, that, responsive to execution by the at least one processor, causes the at least one processor to perform operations comprising:
receiving a plurality of curve manipulation points disposed directly on an existing complex curve in a user interface, the existing complex curve comprising a plurality of curves;
configuring the plurality of curve manipulation points to support movement of each curve manipulation point of the plurality of curve manipulation points specified by a user, the configuring enabling adjustment of the existing complex curve;
receiving a user input to move a curve manipulation point of the plurality of curve manipulation points that lies on a curve of the plurality of curves of the existing complex curve from one location to another;
determining a spatial relationship between points of the existing complex curve and the moved curve manipulation point;
computing a blending factor, without fitting a segment of a curve to the points of the existing complex curve and the moved curve manipulation point, based on the spatial relationship between the points of the existing complex curve and the moved curve manipulation point, the blending factor specifying a weighting defining how a plurality of curve fitting techniques are to be used to fit the segment of the curve to the points of the existing complex curve and the moved curve manipulation point;
adjusting the curve of the plurality of curves of the existing complex curve that contains the curve manipulation point automatically and without user intervention by blending the plurality of curve fitting techniques using the weighting of the plurality of curve fitting techniques corresponding to the computed blending factor such that the adjusted curve maintains slope and curvature continuity in relation to other curves of the plurality of curves of the existing complex curve.

18. A system as described in claim 17, wherein the curve manipulation point corresponding to the movement specified by the user is maintained through the movement.

19. A system as described in claim 18, wherein the adjusting is performed such that subsequent to the movement of the curve manipulation point involved in the movement lies near a location of maximum curvature of the curve.

* * * * *